US011265226B2

(12) United States Patent
Hu et al.

(10) Patent No.: US 11,265,226 B2
(45) Date of Patent: Mar. 1, 2022

(54) SERVICE MANAGEMENT METHOD AND APPARATUS THEREOF

(71) Applicant: HUAWEI TECHNOLOGIES CO., LTD., Guangdong (CN)

(72) Inventors: Xiang Hu, Beijing (CN); Yuan Xia, Beijing (CN); Quan Zhu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 170 days.

(21) Appl. No.: 16/552,806

(22) Filed: Aug. 27, 2019

(65) Prior Publication Data
US 2019/0386894 A1 Dec. 19, 2019

Related U.S. Application Data
(63) Continuation of application No. PCT/CN2018/076985, filed on Feb. 23, 2018.

(30) Foreign Application Priority Data
Feb. 28, 2017 (CN) .......................... 201710113550.8

(51) Int. Cl.
*H04L 12/24* (2006.01)
*H04L 41/50* (2022.01)
(Continued)

(52) U.S. Cl.
CPC .......... *H04L 41/50* (2013.01); *H04L 41/0893* (2013.01); *H04L 47/20* (2013.01); *H04L 65/1069* (2013.01)

(58) Field of Classification Search
CPC ..... H04L 41/50; H04L 41/0893; H04L 47/20; H04L 65/1069; H04L 12/1407;
(Continued)

(56) References Cited

U.S. PATENT DOCUMENTS

2012/0167162 A1* 6/2012 Raleigh ................. H04L 41/082
726/1
2015/0098325 A1* 4/2015 Lu ....................... H04M 15/8027
370/230
(Continued)

FOREIGN PATENT DOCUMENTS

CN 101159923 A 4/2008
CN 101378522 A 3/2009
(Continued)

OTHER PUBLICATIONS

3GPP TS 23.401 V14.2.0 (Dec. 2016);3rd Generation Partnership Project;Technical Specification Group Services and System Aspects;General Packet Radio Service (GPRS) enhancements for Evolved Universal Terrestrial Radio Access Network (E-UTRAN) access(Release 14);total 385 pages.

*Primary Examiner* — Philip J Chea
*Assistant Examiner* — Wuji Chen
(74) *Attorney, Agent, or Firm* — Womble Bond Dickinson (US) LLP

(57) ABSTRACT

A service management method and an apparatus thereof are disclosed. The method includes: obtaining, by user equipment, a communication address of a gateway user plane, and establishing a communication link to the gateway user plane by using the communication address; sending a session connection create request message to the gateway user plane by using the communication link; receiving, by using the communication link, a session connection create response message sent by the gateway user plane; and when the authentication result is that the authentication succeeds, performing service management based on service policy information that is sent by the gateway user plane by using the communication link. According to the embodiments of the present disclosure, a participation level of the user (Continued)

equipment can be increased, and a service management capability of the user equipment can be improved.

14 Claims, 15 Drawing Sheets

(51) Int. Cl.
*H04L 41/0893* (2022.01)
*H04L 47/20* (2022.01)
*H04L 65/1069* (2022.01)

(58) Field of Classification Search
CPC ....... H04L 29/08; H04L 63/08; H04L 67/141; H04W 48/18; H04W 4/24; H04W 12/06; H04M 15/66
See application file for complete search history.

(56) References Cited

U.S. PATENT DOCUMENTS

| | | |
|---|---|---|
| 2015/0110095 A1 | 4/2015 | Tan et al. |
| 2015/0139084 A1 | 5/2015 | Kaczmarska-Wojtania et al. |
| 2016/0344635 A1 | 11/2016 | Lee et al. |
| 2017/0289265 A1* | 10/2017 | Faccin .................. H04W 48/17 |
| 2017/0289791 A1* | 10/2017 | Yoo ..................... H04W 68/005 |
| 2018/0097657 A1* | 4/2018 | Dao ........................ H04L 47/12 |
| 2018/0227299 A1 | 8/2018 | Varon et al. |
| 2018/0227743 A1* | 8/2018 | Faccin .................. H04W 76/10 |
| 2018/0241635 A1* | 8/2018 | Rao ..................... H04L 41/0816 |
| 2019/0109721 A1* | 4/2019 | Qiao ................... H04L 63/0254 |
| 2019/0109823 A1* | 4/2019 | Qiao ................... H04L 12/1492 |
| 2019/0297121 A1* | 9/2019 | Qiao ................... H04L 61/2007 |
| 2020/0128614 A1* | 4/2020 | Ying ..................... H04L 29/08 |
| 2020/0154389 A1* | 5/2020 | Karampatsis .......... H04L 63/20 |

FOREIGN PATENT DOCUMENTS

| | | |
|---|---|---|
| CN | 103731929 A | 4/2014 |
| CN | 105101136 A | 11/2015 |
| CN | 105260842 A | 1/2016 |
| CN | 105828315 A | 8/2016 |
| CN | 105933246 A | 9/2016 |
| JP | 2009253678 A | 10/2009 |
| WO | 2013089660 A1 | 6/2013 |
| WO | 2014000286 A1 | 1/2014 |
| WO | 2017021649 A1 | 2/2017 |
| WO | 2017028163 A1 | 2/2017 |

* cited by examiner

SERVICE MANAGEMENT METHOD AND APPARATUS THEREOF

CROSS-REFERENCE TO RELATED APPLICATIONS

This application is a continuation of International Application No. PCT/CN2018/076985, filed on Feb. 23, 2018, which claims priority to Chinese Patent Application No. 201710113550.8, filed on Feb. 28, 2017, The disclosures of the aforementioned applications are hereby incorporated by reference in their entireties.

TECHNICAL FIELD

The present disclosure relates to the field of communications technologies, and in particular, to a service management method and an apparatus thereof.

BACKGROUND

As a service awareness capability based on deep packet inspection (DPI) on a mobile broadband network poses an increasing quantity of control and charging requirements on services, a packet core network device such as a gateway general packet radio service (GPRS) support node (Gateway GPRS Support Node, GGSN), packet data network gateway (PGW), or traffic detection function (TDF) needs to perceive, charge, and control service flows by using a DPI function, a content charging function, and a service control function of the packet core network device, and also supports a function of selecting a service flow path and a bearer.

The PGW is a functional entity in an evolved packet core (EPC) network, a user plane anchor between a 3rd Generation Partnership Project (3GPP) access network and a non-3GPP access network, and an interface on which an EPC core network packet switched domain is connected to an external packet data network (PDN), and is configured to: detect a service data flow and enforce a charging and control policy. In a $4^{th}$-generation mobile communications ($4^{th}$-Generation, 4G) network and a $3^{rd}$-generation mobile communications ($3^{rd}$-Generation, 3G) network, the PGW may serve as a policy and charging enforcement function (PCEF), and is connected to a policy and charging rules function (PCRF) through a Gx interface.

The GGSN may serve as a PCEF in a $2^{nd}$-generation mobile communications ($2^{nd}$-Generation, 2G) network.

In a 2G/3G/4G network architecture, a PCEF supports a basic policy and charging control (PCC) function, and implements policy and charging control by using a policy delivered by the PCRF. The PCEF supports a policy delivered by the PCRF or an authentication, authorization and accounting (AAA) server or a locally configured policy, and is responsible for service flow data detection, policy enforcement, and flow-based charging processing.

FIG. 1a is a schematic diagram of deployment of gateway devices in a 2G/3G/4G network architecture. Service management is completed on the PGW/GGSN, such as awareness of all services, policy matching, and charging and control policy enforcement. During an entire network function division process, user equipment (UE) supports only related information delivered by a control plane device of a core network by using a signaling message, such as a traffic flow template (TFT), a bearer level identifier, and quality of service (QoS), to select a bearer of an uplink service flow and implement a QoS policy.

FIG. 1b is a schematic diagram of deployment of gateway devices in a network structure with a user plane separated from a control plane (for example, a $5^{th}$-generation mobile communication ($5^{th}$-Generation, 5G) network architecture). A centralized gateway is deployed in a backbone network, and functions of control planes of a serving gateway (SGW) and a PGW are included, such as switching a mobile signaling plane anchor between base stations, charging for inter-operator roaming, processing access signaling, processing dedicated bearer create signaling, allocating an address pool, and controlling user access authentication. A distributed gateway is deployed in a metropolitan core network, and functions of user planes of an SGW and a PGW are included, such as switching mobile data description between base stations, forwarding user data, collecting user charging information, enforcing a charging and control policy, and processing service DPI. The centralized gateway and the distributed gateway jointly complete the functions of the serving gateway (SGW)/PGW. Even though the 5G network architecture implements separation between a user plane and a control plane, UE still neither participates in service awareness, policy matching, and charging and control policy enforcement, and nor participates in a dynamic slice selection policy in a network slicing scenario.

As new applications and service scenarios evolve, types of UE, a supportable service scenario, a server-side encrypted transmission capability, and the like all develop by leaps and bounds. In a current network architecture, it is more difficult to complete service management on a core network gateway device.

SUMMARY

Embodiments of the present disclosure provide a service management method and an apparatus thereof, so that user equipment performs service management, a participation level of the user equipment can be increased, and a service management capability of the user equipment can be improved.

A first aspect of the embodiments of the present disclosure provides a service management method, including:
  obtaining, by user equipment, a communication address of a gateway user plane, and establishing a communication link to the gateway user plane by using the communication address;
  sending, by the user equipment, a session connection create request message to the gateway user plane by using the communication link, where the session connection create request message includes authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment;
  receiving, by the user equipment by using the communication link, a session connection create response message sent by the gateway user plane, where the session connection create response message includes an authentication result; and if the authentication result is that the authentication succeeds, performing, by the user equipment, service management based on service policy information that is sent by the gateway user plane by using the communication link.

According to the first aspect of the embodiments of the present disclosure, the user equipment establishes the communication link to the gateway user plane by using the communication address of the gateway user plane, so that the user equipment performs, when the authentication succeeds, service management based on the service policy information sent by the gateway user plane, and therefore the user equipment performs service management, a participation level of the user equipment can be increased, and a service management capability of the user equipment can be improved.

In a possible implementation, the authentication information of the gateway terminal module of the user equipment includes information such as an identifier of the gateway terminal module of the user equipment and keyword information, and is used by the authentication server to perform authentication on the gateway terminal module of the user equipment.

In a possible implementation, the service policy information includes at least one current network slice connection policy, the at least one current network slice connection policy is at least one original network slice connection policy or at least one updated network slice connection policy, and a network slice connection policy is used to indicate a session connection relationship between an application identifier and a network slice; and the process of performing, by the user equipment, service management based on service policy information that is sent by the gateway user plane by using the communication link is as follows:

obtaining, by the user equipment, an application identifier of a current application;

searching, by the user equipment for a network slice corresponding to the application identifier of the current application, the at least one current network slice connection policy that is sent by the gateway user plane by using the communication link; and establishing, by the user equipment, a session connection and performing service access based on the found network slice.

In the possible implementation, the user equipment may independently select the network slice to perform the session connection and the service access, thereby reducing processing pressure of a core network device, and improving a processing capability of the user equipment.

In a possible implementation, the at least one current network slice connection policy is the at least one updated network slice connection policy; and before the performing service management based on service policy information that is sent by the gateway user plane by using the communication link, the user equipment sends a session connection update response message to the gateway user plane by using the communication link, where the session connection update response message is used to indicate that the user equipment has updated the at least one original network slice connection policy, so that the gateway user plane learns an update status of the user equipment.

In a possible implementation, the service policy information includes at least one service charging and control policy, and a service charging and control policy is used to indicate a correspondence between an application identifier and a charging and control policy; and the process of performing, by the user equipment, service management based on service policy information that is sent by the gateway user plane by using the communication link is as follows:

obtaining, by the user equipment, an application identifier of a current application that accesses a data service;

searching, by the user equipment for a charging and control policy corresponding to the application identifier of the current application, the at least one service charging and control policy that is sent by the gateway user plane by using the communication link; and collecting, by the user equipment, statistics about data traffic and performing access control based on the found charging and control policy.

In the possible implementation, the user equipment collects the statistics about the data traffic of the current application and performs access control, thereby increasing a participation level of the user equipment and improving a processing capability of the user equipment.

In a possible implementation, after the performing service management based on service policy information that is sent by the gateway user plane by using the communication link, the user equipment periodically sends a usage report request message to the gateway user plane by using the communication link, where the usage report request message includes feature attribute information of the user equipment and statistics about traffic usage for an application, the usage report request message is used to inform the gateway user plane of usage, and is used to request the gateway user plane to generate an online or offline call detail record and feed back a usage report confirmation message, and the usage report confirmation message is used to indicate that the gateway user plane has confirmed the statistics about traffic usage for an application.

In a possible implementation, the user equipment obtains the communication address of the gateway user plane based on an attach response message sent by an access network gateway, where the attach response message includes the communication address of the gateway user plane. The communication address is obtained based on the attach response message without specially sending a request, and implementation is simple and convenient.

In a possible implementation, the user equipment obtains the communication address of the gateway user plane based on preconfiguration information of the user equipment, where the preconfiguration information may be configured by an operator when the user equipment is customized, and obtaining the communication address based on the preconfiguration information does not change an existing activation procedure.

In a possible implementation, the user equipment obtains the communication address of the gateway user plane in a configuration manner selected by a user. In other words, obtaining the communication address by the user equipment through manual configuration does not change an existing activation procedure.

In a possible implementation, before the establishing a communication link to the gateway user plane by using the communication address, the user equipment detects whether the gateway terminal module of the user equipment, a right of the user equipment, and a network operating environment meet a preset condition; and if a detection result is yes, establishes the communication link to the gateway user plane by using the communication address. Whether the user equipment can establish the communication link is determined based on the preset condition, to ensure security of the communication link.

In a possible implementation, the session connection create request message further includes the feature attribute information of the user equipment, the feature attribute information of the user equipment includes a mobile station integrated services digital network number (MSISDN) and an international mobile subscriber identity IMSI, and the MSISDN and the IMSI are used to identify the user equipment.

In a possible implementation, the connection session create response message further includes the feature attribute information of the user equipment, so as to associate the user equipment with the authentication result.

In a possible implementation, the authentication information of the gateway terminal module of the user plane device, the authentication result, the service policy information, the feature attribute information of the user equipment, and the statistics about traffic usage for an application are transmitted in an encrypted manner on the communication link, thereby preventing the transmitted content from being tampered with, and ensuring transmission security.

A second aspect of the embodiments of the present disclosure provides a service management method, including:

receiving, by a gateway user plane by using a communication link, a session connection create request message sent by user equipment, where the session connection create request message includes authentication information of a gateway terminal module of the user equipment, and the communication link is a link established by the user equipment to the gateway user plane by using an obtained communication address of the gateway user plane;

sending, by the gateway user plane, an authentication request message to a gateway control plane, where the authentication request message includes the authentication information of the gateway terminal module of the user equipment, and the authentication request message is used to trigger the gateway control plane to request an authentication server to perform authentication on the gateway terminal module of the user equipment;

receiving, by the gateway user plane, an authentication response message sent by the gateway control plane, and sending a session connection create response message to the user equipment by using the communication link, where the authentication response message and the session connection create response message include an authentication result; and if the authentication result is that the authentication succeeds, receiving, by the gateway user plane, service policy information sent by the gateway control plane, and sending the service policy information to the user equipment by using the communication link, where the service policy information is used by the user equipment to perform service management based on the service policy information.

According to the second aspect of the embodiments of the present disclosure, when the user equipment is authenticated, the service policy information is sent to the user equipment by using the communication link that is established to the user equipment, and the user equipment performs service management based on the service policy information, so that service management pressure of a core network device can be reduced, and a service management capability of the user equipment can be improved.

In a possible implementation, the service policy information includes at least one current network slice connection policy, the at least one current network slice connection policy is at least one original network slice connection policy or at least one updated network slice connection policy, and a network slice connection policy is used to indicate a session connection relationship between an application identifier and a network slice, so that the user equipment independently selects a network slice to perform a session connection and service access, thereby reducing processing pressure of a core network device, and improving a processing capability of the user equipment.

In a possible implementation, when the at least one current network slice connection policy is the at least one updated network slice connection policy, the gateway user plane receives, by using the communication link, a session connection update response message sent by the user equipment, where the session connection update response message is used to indicate that the user equipment has updated the at least one original network slice connection policy, to learn an update status of the user equipment.

In a possible implementation, the service policy information includes at least one service charging and control policy, a service charging and control policy is used to indicate a correspondence between an application identifier and a charging and control policy, so that the user equipment collects statistics about and performs access control on data traffic of a current application, thereby increasing a participation level of the user equipment and improving a processing capability of the user equipment.

In a possible implementation, the gateway user plane receives, by using the communication link, a usage report request message periodically sent by the user equipment, where the usage report request message includes feature attribute information of the user equipment and statistics about traffic usage for an application; and generates an online or offline call detail record based on the usage report request message and feeds back a usage report confirmation message to the user equipment by using the communication link, where the usage report confirmation message is used to indicate that the gateway user plane has confirmed the statistics about traffic usage for an application.

In a possible implementation, the session connection create request message further includes the feature attribute information of the user equipment, the feature attribute information of the user equipment includes an MSISDN and an IMSI, and the MSISDN and the IMSI are used to identify the user equipment.

In a possible implementation, the authentication response message and the connection session create response message further include the feature attribute information of the user equipment, to associate the user equipment with the authentication result.

In a possible implementation, the authentication information of the gateway terminal module of the user plane device, the authentication result, the service policy information, the feature attribute information of the user equipment, and the statistics about traffic usage for an application are transmitted in an encrypted manner on the communication link, thereby preventing the transmitted content from being tampered with, and ensuring transmission security.

A third aspect of the embodiments of the present disclosure provides user equipment, including:

an obtaining unit, configured to obtain a communication address of a gateway user plane;

an establishment unit, configured to establish a communication link to the gateway user plane by using the communication address;

a sending unit, configured to send a session connection create request message to the gateway user plane by using the communication link, where the session connection create request message includes authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment;

a receiving unit, configured to receive, by using the communication link, a session connection create response message sent by the gateway user plane, where the session connection create response message includes an authentication result; and a management unit, configured to: if the authentication result is that the authentication succeeds, perform service management based on service policy information that is sent by the gateway user plane by using the communication link.

The user equipment provided in the third aspect of the embodiments of the present disclosure is configured to implement the functions executed by the user equipment in the service management method provided in the first aspect of the embodiments of the present disclosure.

A fourth aspect of the embodiments of the present disclosure provides a gateway user plane, including:

a receiving unit, configured to receive, by using a communication link, a session connection create request message sent by user equipment, where the session connection create request message includes authentication information of a gateway terminal module of the user equipment, and the communication link is a link established by the user equipment to the gateway user plane by using an obtained communication address of the gateway user plane; and a sending unit, configured to send an authentication request message to a gateway control plane, where the authentication request message includes the authentication information of the gateway terminal module of the user equipment, and the authentication request message is used to trigger the gateway control plane to request an authentication server to perform authentication on the gateway terminal module of the user equipment, where the receiving unit is further configured to receive an authentication response message sent by the gateway control plane;

the sending unit is further configured to send a session connection create response message to the user equipment by using the communication link, where the authentication response message and the session connection create response message include an authentication result;

the receiving unit is further configured to: if the authentication result is that the authentication succeeds, receive service policy information sent by the gateway control plane; and the sending unit is further configured to send the service policy information to the user equipment by using the communication link, where the service policy information is used by the user equipment to perform service management based on the service policy information.

The gateway user plane provided in the fourth aspect of the embodiments of the present disclosure is configured to implement the functions executed by the gateway user plane in the service management method provided in the second aspect of the embodiments of the present disclosure.

A fifth aspect of the embodiments of the present disclosure provides another user equipment, including a processor and a transceiver, where the processor is configured to: obtain a communication address of a gateway user plane, and establish a communication link to the gateway user plane by using the communication address;

the transceiver is configured to send a session connection create request message to the gateway user plane by using the communication link, where the session connection create request message includes authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment;

the transceiver is further configured to receive, by using the communication link, a session connection create response message sent by the gateway user plane, where the session connection create response message includes an authentication result; and if the authentication result is that the authentication succeeds, the processor is further configured to perform service management based on service policy information that is sent by the gateway user plane by using the communication link.

The user equipment provided in the fifth aspect of the embodiments of the present disclosure is configured to implement the functions executed by the user equipment in the service management method provided in the first aspect of the embodiments of the present disclosure.

A sixth aspect of the embodiments of the present disclosure provides another gateway user plane, including a processor and a transceiver, where the transceiver is configured to receive, by using a communication link, a session connection create request message sent by user equipment, where the session connection create request message includes authentication information of a gateway terminal module of the user equipment, and the communication link is a link established by the user equipment to the gateway user plane by using an obtained communication address of the gateway user plane;

the transceiver is further configured to send an authentication request message to a gateway control plane, where the authentication request message includes the authentication information of the gateway terminal module of the user equipment, and the authentication request message is used to trigger the gateway control plane to request an authentication server to perform authentication on the gateway terminal module of the user equipment;

the transceiver is further configured to: receive an authentication response message sent by the gateway control plane, and send a session connection create response message to the user equipment by using the communication link, where the authentication response message and the session connection create response message include an authentication result; and if the authentication result is that the authentication succeeds, the transceiver is further configured to: receive service policy information sent by the gateway control plane, and send the service policy information to the user equipment by using the communication link, where the service policy information is used by the user equipment to perform service management based on the service policy information.

The gateway user plane provided in the sixth aspect of the embodiments of the present disclosure is configured to implement the functions executed by the gateway user plane in the service management method provided in the second aspect of the embodiments of the present disclosure.

In the embodiments of the present disclosure, the user equipment obtains the communication address of the gateway user plane, establishes the communication link to the gateway user plane, and sends, to the gateway user plane by using the communication link, the session connection create request message that carries the authentication information of the gateway terminal module of the user equipment. When receiving the session connection create request message, the gateway user plane sends the authentication request message to the gateway control plane, and the authentication request message is used to trigger the gateway control plane to request the authentication server to perform authentication on the gateway terminal module of the user equipment. The authentication server performs authentication on the gateway terminal module of the user equipment, and feeds back the authentication result to the gateway control plane. When receiving the authentication result, the gateway control plane adds the authentication result to the authentication response message and sends the authentication response message to the gateway user plane, and the gateway user plane adds the authentication result to the session connection create response message and sends the session connection create response message to the user equipment. If the authentication result is that the authentication succeeds, the gateway control plane sends the service policy information to the gateway user plane, the gateway user plane sends the service policy information to the user equipment, and the user equipment performs service management based on the service policy information, so that the user equipment performs service management, a participation level of the user equipment can be increased, and a service management capability of the user equipment can be improved.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The following describes the embodiments of the present disclosure with reference to the accompanying drawings in the embodiments of the present disclosure.

Figure 1A:
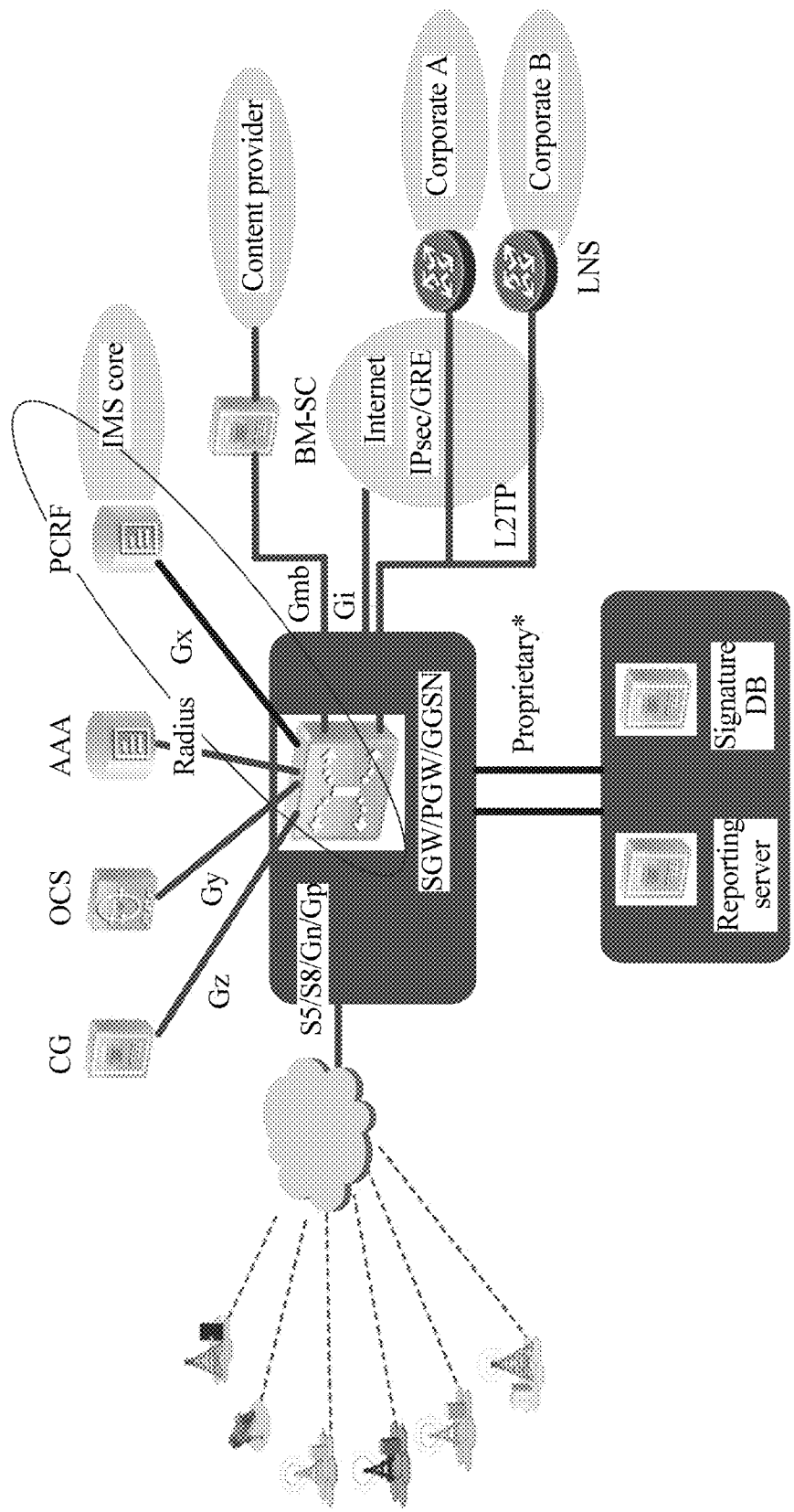
FIG. 1a is a schematic diagram of deployment of gateway devices in a 2G/3G/4G network architecture.
Figure 1B:
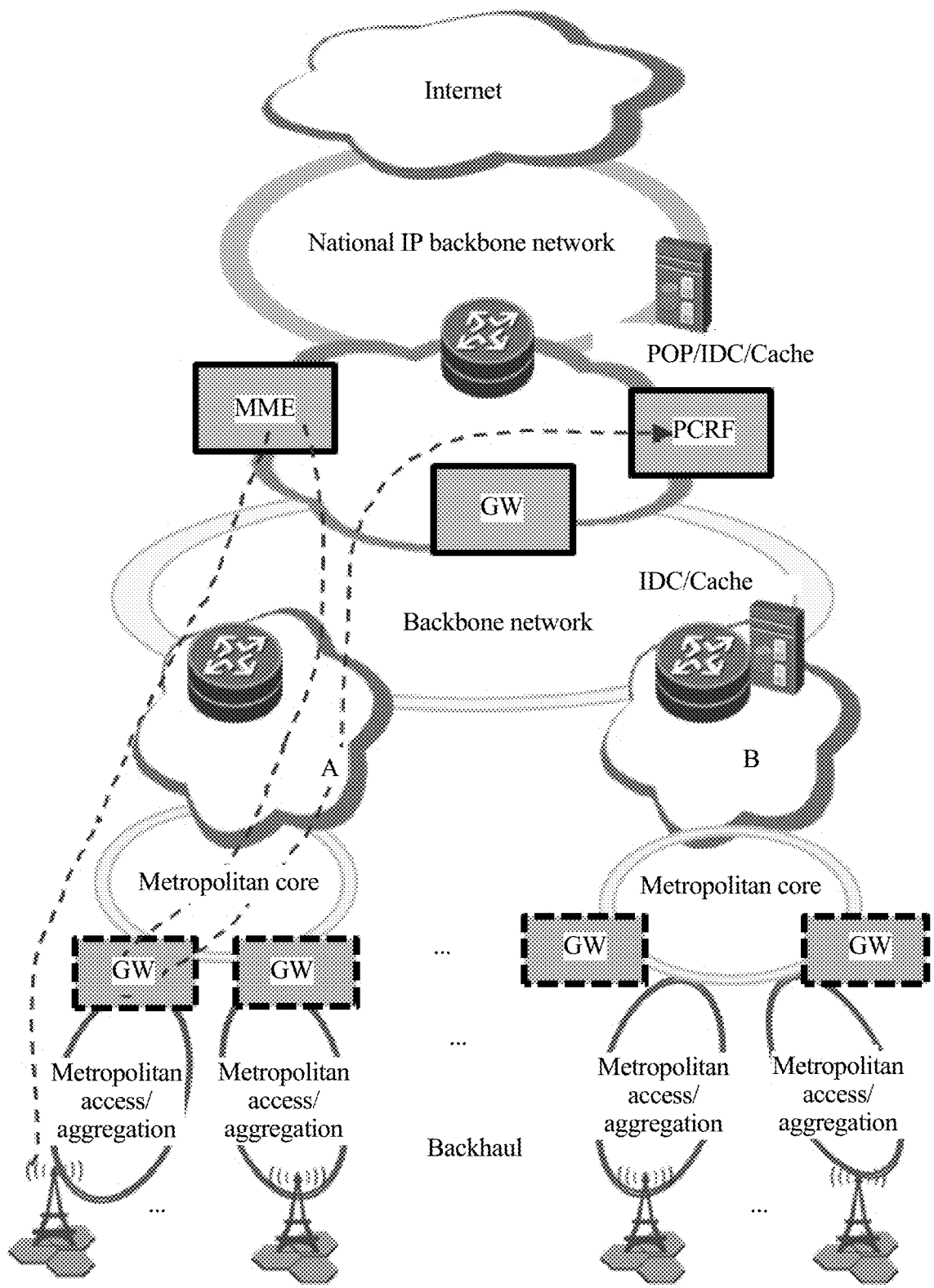
FIG. 1b is a schematic diagram of deployment of gateway devices in a network structure with a user plane separated from a control plane.
Figure 2:
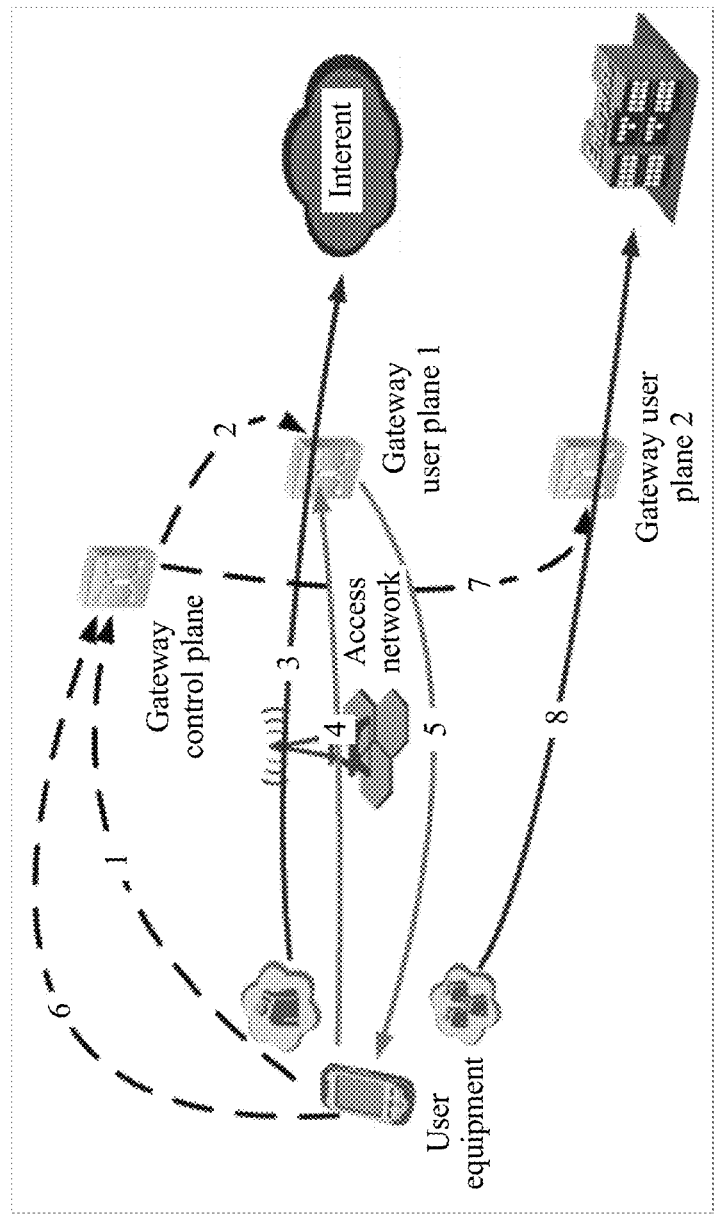
FIG. 2 is a schematic structural diagram of a service management system according to an embodiment of the present disclosure.

FIG. 2 is a schematic structural diagram of a service management system according to an embodiment of the present disclosure. The service management system includes user equipment (UE), a radio access network (RAN), a gateway control plane (GW-C), a gateway user plane (GW-U) 1, a gateway user plane 2, the Internet, and an augmented reality (AR) server (an Enterprise shown in FIG. 2). It should be noted that forms and quantities of elements shown in FIG. 2 do not constitute a limitation on this embodiment of the present disclosure.

The UE has a gateway terminal (GW-T) module, the module may implement functions between the UE and the GW-U by using a data communication link, such as authentication, policy interaction, and statistics reporting, to assist a core network side in dynamically deploying and selecting a future network slice, collecting statistics about application data services and reporting the application data services, policy control, and the like.

The access network may be an access network in a 2G/3G/4G network architecture, an access network in a network structure with a user plane separated from a control plane, or an access network in a future communications network architecture.

The gateway control plane is a gateway control plane functional entity, and the gateway user plane is a gateway user plane functional entity. The GW-C may be a serving gateway control plane (SGW-C) or a packet data network gateway control plane (PGW-C), and may further integrate functions of a control plane in a core network device. For example, the GW-C may include functions of control planes of an SGW and a PGW. A GW-U may be a serving gateway user plane (SGW-U) or a packet data network gateway user plane (PGW-U), and may further integrate functions of a user plane in the core network device. For example, the GW-U may include functions of user planes of an SGW and a PGW. The GW-C and the GW-U may be deployed in an integrated manner or separately. Further, there may be different GW-Us in different application scenarios. For example, the GW-U 1 shown in FIG. 2 is applied to a scenario in which the Internet is accessed, and the GW-U 2 is applied to a scenario in which an AR service is accessed.

AR means adding content based on reality by using technologies, among which core ones include real object identification, geographical location locating, instant calculation required in different scenarios, and the like. There are different AR servers for different types of AR services.

Currently, the UE accesses the Internet by using dashed lines 1 and 2 shown in FIG. 2, the dashed line 1 represents that the UE establishes a public network service session, and the dashed line 2 represents that the GW-C instructs the GW-U 1 to establish an Sx bearer context. The UE accesses an AR service by using dashed lines 6 and 7 shown in FIG.

2, the dashed line 6 represents that the UE establishes an AR service session, and the dashed line 7 represents that the GW-C instructs the GW-U 2 to establish an Sx bearer context. Sx represents a session connection between the GW-C and the GW-U. It can be learned that the UE currently needs to access a service by using the GW-C and the GW-U.

In this embodiment of the present disclosure, the UE may establish a data communication link to the GW-U. Specifically, the GW-T module of the UE may establish a data communication link to the GW-U. After establishing the data communication link, the UE directly performs service access by using the GW-U. With reference to the schematic diagram shown in FIG. 2, a solid line 4 represents that the UE completes, by using the data communication link, a process of performing authentication on the GW-T module. A solid line 3 represents that the UE accesses the Internet by using the GW-U 1. A solid line 5 represents that the GW-U 1 delivers service policies to the UE by using the data communication link, and the service policies may include a network slice connection policy, a charging and control policy, and the like. A solid line 8 represents that the UE accesses an AR service by using the GW-U 2.

Scenarios, shown in FIG. 2, of accessing the Internet and the AR service are merely used as an example. During actual application, FIG. 2 may further include a server and a GW-U that correspond to a service, such as the Internet of Things (IoT), remote medical treatment, or self-driving, so that the UE accesses the service such as the IoT, remote medical treatment, or self-driving. The AR, the IoT, the remote medical treatment, and the self-driving respectively correspond to different service level agreements (SLA).

The user equipment in this embodiment of the present disclosure may be an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant PDA), a handheld device having a wireless communication function, a computing device, another processing device connected to a wireless modem, a vehicle-mounted device, a wearable device, user equipment in a future wireless communications network, or the like. It should be noted that the user equipment in this embodiment of the present disclosure has the GW-T module. The module may be a chip or a hardware module designed in the user equipment, or a system application program (when the user equipment is unrooted, the application program cannot be deleted) installed in the user equipment. This is determined depending on a specific case. In other words, the user equipment in this embodiment of the present disclosure may be customized user equipment provided by an operator.

Figure 3:
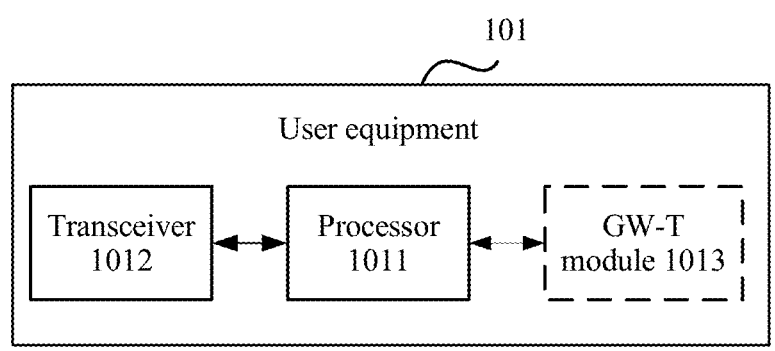
FIG. 3 is a schematic structural diagram of user equipment according to an embodiment of the present disclosure.

FIG. 3 is a schematic structural diagram of user equipment according to an embodiment of the present disclosure. User equipment 101 includes a processor 1011 and a transceiver 1012. During actual application, the user equipment 101 may further include other parts such as a power supply, a display module, a sensing module, and an audio module. The processor 1011 may be a controller, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits that are described with reference to this embodiment of the present disclosure. Alternatively, the processor 1011 may be a combination of processors implementing a computing function, for example, a combination of one or more microprocessors, or a combination of the DSP and a microprocessor. The transceiver 1012 is configured to implement communication or data transmission between the user equipment 101 and a network device such as a base station or a satellite, and is further configured to implement communication or data transmission between the user equipment 101 and another user equipment. When the transceiver 1012 is applied to this embodiment of the present disclosure, the transceiver 1012 is configured to perform communication or data transmission between the user equipment 101 and a gateway user plane. If a GW-T module is a chip or a hardware module designed in the user equipment, the user equipment 101 shown in FIG. 3 further includes a GW-T module 1013, configured to implement functions between the user equipment 101 and the gateway user plane, such as authentication, policy interaction, and statistics reporting, to assist a core network side in dynamically deploying and selecting a future network slice, collecting statistics about application data services and reporting the application data services, policy control, and the like. The GW-T module 1013 may be integrated in the processor 1011 or the transceiver 1012, or may be an independently deployed module.

Figure 4:
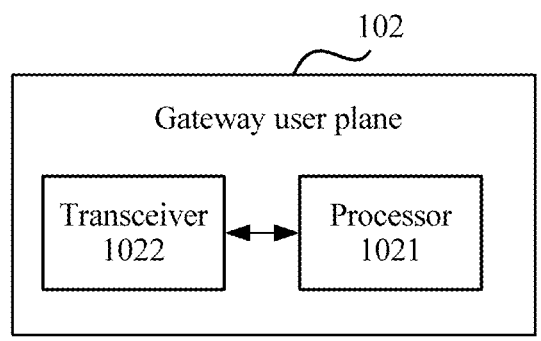
FIG. 4 is a schematic structural diagram of a gateway user plane according to an embodiment of the present disclosure.

The gateway user plane in this embodiment of the present disclosure implements a user plane function of a core network device such as an SGW and/or a PGW. FIG. 4 is a schematic structural diagram of a gateway user plane according to an embodiment of the present disclosure. A gateway user plane 102 includes a processor 1021 and a transceiver 1022. The processor 1021 is configured to implement or execute various example logical blocks, modules, and circuits that are described with reference to this embodiment of the present disclosure. The transceiver 1022 is configured to implement communication or data transmission between the gateway user plane 102 and each of a gateway control plane, user equipment, and another core network device. The gateway user plane 102 includes a communication address (GW-U IP Address for GW-T) of a GW-T module for the user equipment. During actual application, the gateway user plane includes a plurality of communication addresses, and the GW-U IP Address for GW-T is used to establish a data communication link to the GW-T module of the user equipment, so that the gateway user plane 102 delivers service policy information to the user equipment. The schematic structural diagram of the gateway user plane shown in FIG. 4 may also be a schematic structural diagram of a gateway control plane.

An authentication server, namely, an AAA server is further used in this embodiment of the present disclosure, and is configured to perform authentication on the GW-T module of the user equipment.

A service management method provided in embodiments of the present disclosure is described below in detail with reference to FIG. 5A to FIG. 8C. It should be noted that description is provided in FIG. 5A to FIG. 8C from a perspective of interaction between user equipment and a gateway user plane. Embodiment 1 shown in FIG. 5A, FIG. 5B, and FIG. 5C generally describes the service management method, Embodiment 2 and Embodiment 3 respectively shown in FIG. 6A, FIG. 6B, FIG. 6C, and FIG. 7 describe a network slice connection of an AR service, and Embodiment 4 shown in FIG. 8A, FIG. 8B, and FIG. 8C describes charging and control of a data service.

Figure 5A:
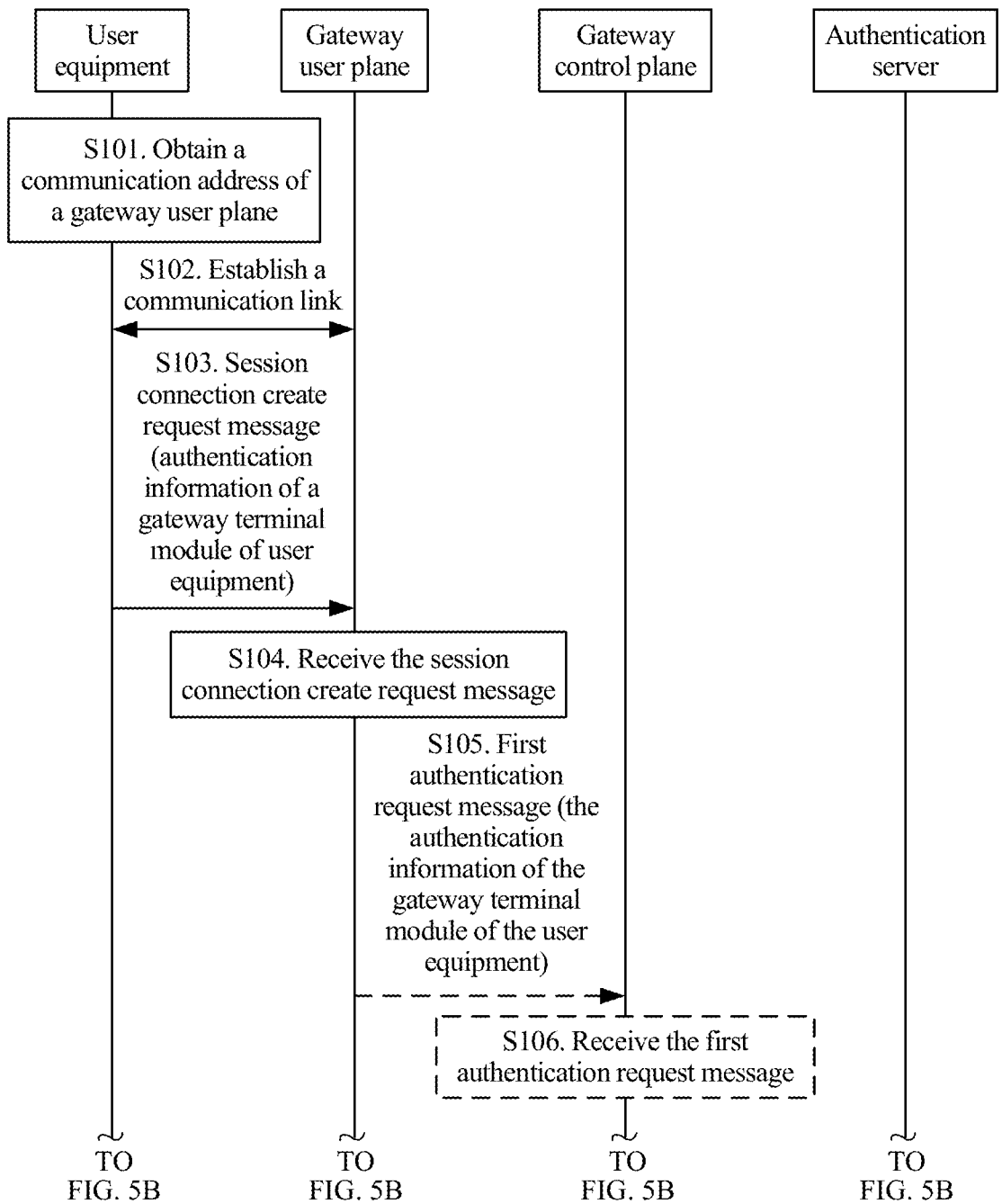
FIG. 5A, FIG. 5B, and FIG. 5C are a schematic communication diagram of a service management method according to Embodiment 1 of the present disclosure.
Figure 5B:
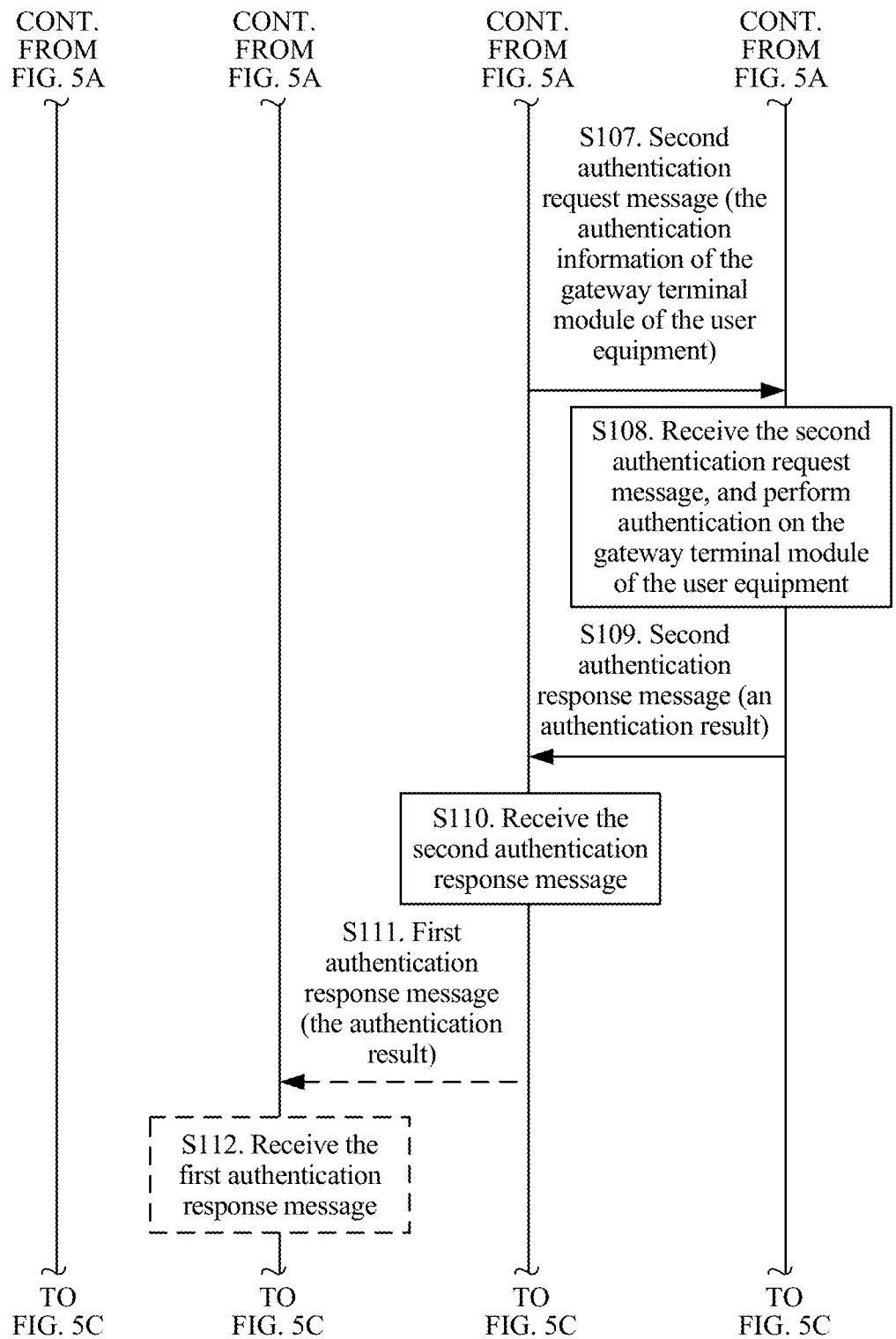
Figure 5C:
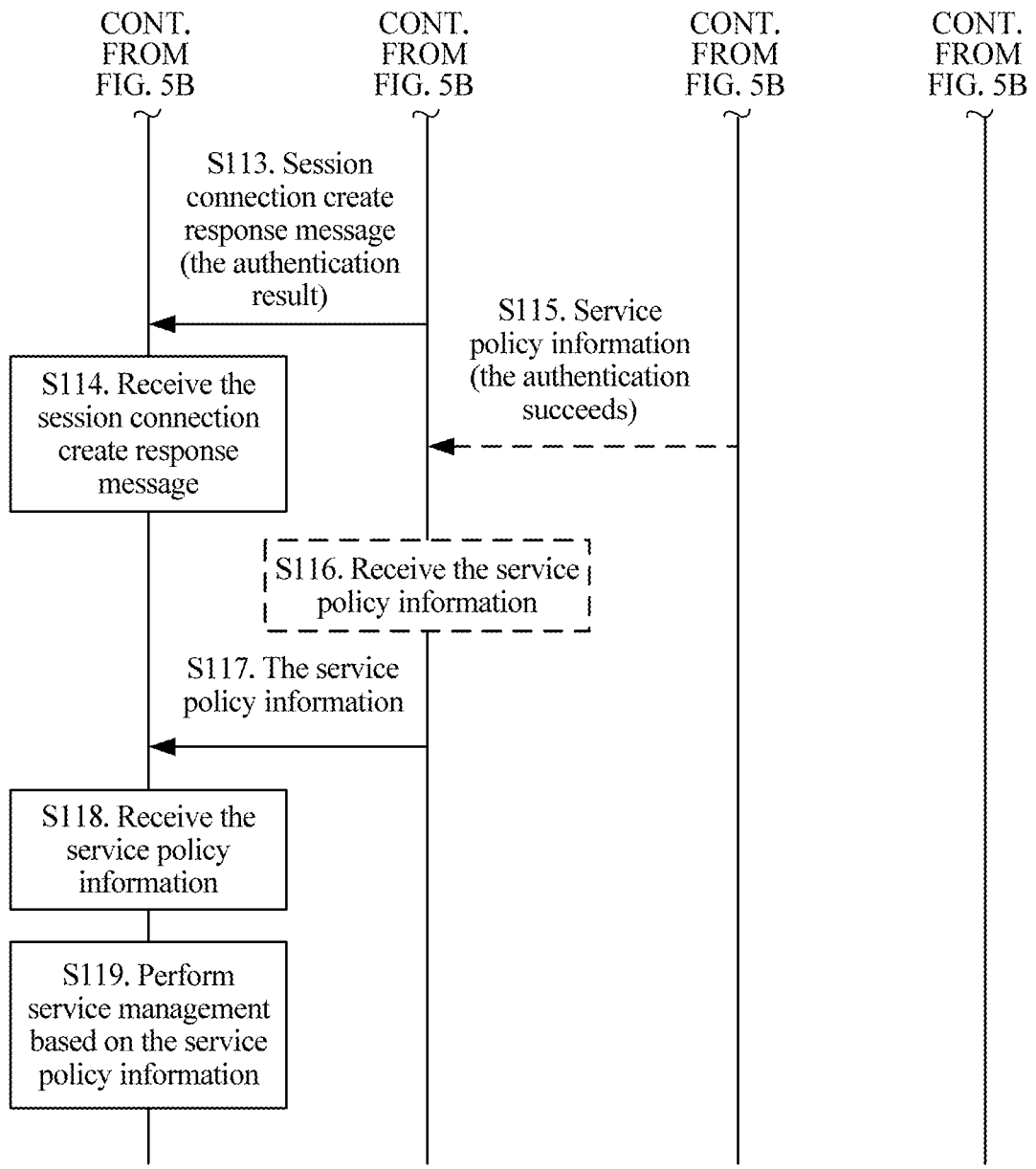

FIG. 5A, FIG. 5B, and FIG. 5C are a schematic communication diagram of a service management method according to Embodiment 1 of the present disclosure. The method includes, but is not limited to, the following operations.

Operation S101: User equipment obtains a communication address of a gateway user plane.

Specifically, before obtaining the communication address of the gateway user plane, the user equipment initiates an activation request message according to a procedure defined in the 3GPP standard document 23401. An example in which an SGW and a PGW exist in a network architecture is used, and a specific process of initiating the activation request message is: The UE sends an attach request to a RAN. When receiving the Attach Request, the RAN sends the Attach Request to a mobility management entity (MME). When receiving the Attach Request, the MME sends a create session request to an SGW-C. When receiving the Create Session Request, the SGW-C sends the Create Session Request to a PGW-C. When receiving the Create Session Request, the PGW-C sends a create session response to the SGW-C. When receiving the Create Session Response, the SGW-C sends the Create Session Response to the MME. When receiving the Create Session Response, the MME sends an attach accept to the RAN. When receiving the Attach Accept, the RAN sends the Attach Accept to the UE, to complete the activation. In the foregoing process, the SGW-C sends an Sx session establishment request to an SGW-U and the SGW-U sends an Sx session establishment response to the SGW-C, to establish an Sx session connection between the SGW-C and the SGW-U. Likewise, an Sx session connection between the PGW-C and a PGW-U may be established. For a user plane/control plane separation network architecture, an MME sends a Create Session Request to a GW-C, and when receiving the Create Session Request, the GW-C sends a Create Session Response to the MME. The GW-C may also establish an Sx session connection to a GW-U.

In a possible implementation, the user equipment obtains the communication address of the gateway user plane based on an attach response message sent by an access network gateway, where the attach response message includes the communication address of the gateway user plane. To be specific, the user equipment obtains the communication address of the gateway user plane by using the Attach Accept sent by the RAN, specifically, obtains the GW-U IP Address for GW-T. An example in which an SGW and a PGW exist in a network architecture is used, and a Create Session Response sent by a PGW-C to an SGW-C carries the GW-U IP Address for GW-T, and the GW-U IP Address for GW-T may be indicated by adding an information element to the Create Session Response. A Create Session Response sent by the SGW-C to an MME carries the GW-U IP Address for GW-T. An Attach Accept sent by the MME to a RAN carries the GW-U IP Address for GW-T. An Attach Accept sent by the RAN to UE carries the GW-U IP Address for GW-T, so that the UE obtains the GW-U IP Address for GW-T by using the Attach Accept sent by the RAN.

In a possible implementation, the user equipment obtains the communication address of the gateway user plane based on preconfiguration information of the user equipment. The preconfiguration information includes the communication address of the gateway user plane, specifically, includes the GW-U IP Address for GW-T. The preconfiguration information may be configured by an operator when the user equipment is customized, or may be configured by a manufacturer of the user equipment, or may be configured by a system of the user equipment. This is not limited herein.

In a possible implementation, the user equipment obtains the communication address of the gateway user plane in a configuration manner selected by a user. The user equipment provides several configuration manners for the user, and obtains the GW-U IP Address for GW-T in the configuration manner selected by the user, that is, obtains the GW-U IP Address for GW-T through manual configuration.

Operation S102: The user equipment establishes a communication link to the gateway user plane.

Specifically, after obtaining the communication address of the gateway user plane, the user equipment may establish the communication link to the gateway user plane. The communication link is a data communication link, and may be used by the gateway user plane to send service policy information to the user equipment, may be used by the user equipment to send a usage report request message to the gateway user plane, and so on. To ensure transmission security, and to prevent the transmitted content from being tampered with, the communication link may encrypt the transmitted content, or the communication link transmits encrypted content.

Before establishing the communication link, the user equipment detects whether a gateway terminal module of the user equipment, a right of the user equipment, and a network operating environment meet a preset condition, and establishes the communication link when a detection result is yes. The preset condition includes that the UE has the GW-T module, the UE is unrooted, an operation right is obtained, and the network operating environment is secure. If there exists at least one of the cases in which the user equipment has no gateway terminal module, the user equipment is rooted, no operation right is obtained, and the network operating environment is insecure, it is determined that the preset condition is not met. That the UE is rooted means that a highest-level right of the UE is changed. That the UE is unrooted means that the right of the UE is consistent with a right provided at delivery, and a highest-level right is not changed. That the operation right is obtained means that the UE can be operated, and can be normally used.

In one embodiment, the communication link is a hyper text transfer protocol over secure socket layer (HTTPS) transmission channel, and the user equipment initiates an HTTPS connection request to the GW-U IP Address for GW-T by using a preset key. When receiving the request, the gateway user plane decrypts the request by using the preset key, and sends an HTTPS connection response to the user equipment, so as to establish the communication link between the user equipment and the gateway user plane.

In one embodiment, the communication link is another secure sockets layer (SSL) transmission channel, and the user equipment initiates a connection request to the GW-U IP Address for GW-T by using a preset key. When receiving the request, the gateway user plane decrypts the request by using the preset key, and sends a connection response to the user equipment, so as to establish the communication link between the user equipment and the gateway user plane.

Both the HTTPS transmission channel and the SSL transmission channel are secure and reliable transmission channels, and another secure and reliable transmission channel may also be used.

Operation S103: The user equipment sends a session connection create request message to the gateway user plane by using the communication link, where the session connection create request message includes authentication information of the gateway terminal module of the user equipment.

Specifically, the user equipment sends the session connection create request message to the gateway user plane by using the communication link, where the session connection create request message includes the authentication information of the gateway terminal module of the user equipment. The authentication information of the gateway terminal module of the user equipment includes information such as an identifier of the GW-T module and keyword information (an authorization/authentication keyword), and is used by the gateway user plane to trigger a gateway control plane to request an authentication server to perform authentication on the GW-T module of the user equipment.

The session connection create request message further includes feature attribute information of the user equipment, and the feature attribute information of the user equipment includes information such as a mobile station integrated services digital network number (MSISDN) and an international mobile subscriber identity (IMSI). The MSISDN and the IMSI are used to identify the user equipment.

The authentication information of the gateway terminal module of the user equipment may be bound to the feature attribute information of the user equipment, and whether the binding is performed is determined by an operator. In one embodiment, the user equipment encrypts the session connection create request message by using the preset key, or encrypts the authentication information of the gateway terminal module of the user equipment and the feature attribute information of the user equipment by using the preset key, to ensure transmission security.

Operation S104: The gateway user plane receives the session connection create request message by using the communication link.

Specifically, the gateway user plane receives the session connection create request message by using the communication link, and parses the session connection create request message to obtain the authentication information of the gateway terminal module of the user equipment. If the session connection create request message is encrypted by using the preset key, the gateway user plane decrypts the session connection create request message by using the preset key, and parses the authentication information of the gateway terminal module of the user equipment. If the session connection create request message further includes the feature attribute information of the user equipment, the gateway user plane parses the feature attribute information. If the authentication information of the gateway terminal module of the user equipment and the feature attribute information of the user equipment are encrypted by using the preset key, the gateway user plane decrypts the authentication information and the feature attribute information by using the preset key, and parses the authentication information and the feature attribute information.

Operation S105: The gateway user plane sends a first authentication request message to the gateway control plane, where the first authentication request message includes the authentication information of the gateway terminal module of the user equipment.

Specifically, when the gateway user plane and the gateway control plane are separately deployed, the first authentication request message further includes a session identifier, and the session identifier is a session identifier of an Sx session, and is used to identify the gateway user plane and the gateway control plane that establish the Sx session. A plurality of gateway user planes and a plurality of gateway control planes may exist in a system architecture shown in FIG. 2, and the Sx session identifier is used to distinguish different gateway user planes connected to gateway control planes.

The first authentication request message further includes the feature attribute information of the user equipment.

Operation S106: The gateway control plane receives the first authentication request message.

Specifically, the gateway control plane receives the first authentication request message, and parses the first authentication request message.

Operation S107: The gateway control plane sends a second authentication request message to the authentication server, where the second authentication request message includes the authentication information of the gateway terminal module of the user equipment.

Specifically, the gateway control plane constructs a second authentication request message based on a parsing result, and sends the second authentication request message to the authentication server. The second authentication request message includes the authentication information of the gateway terminal module of the user equipment. When the gateway user plane and the gateway control plane are separately deployed, the second authentication request message further includes the session identifier.

The second authentication request message further includes the feature attribute information of the user equipment.

Operation S108: The authentication server receives the second authentication request message, and performs authentication on the gateway terminal module of the user equipment.

Specifically, the authentication server receives the second authentication request message, parses the second authentication request message to obtain the authentication information of the gateway terminal module of the user equipment, and performs authentication on the gateway terminal module of the user equipment based on the authentication information of the gateway terminal module of the user equipment.

Operation S109: The authentication server sends a second authentication response message to the gateway control plane, where the second authentication response message includes an authentication result.

Specifically, the authentication server performs authentication on the gateway terminal module of the user equipment to obtain the authentication result, and the authentication result is that the authentication succeeds or fails. After obtaining the authentication result, the authentication server sends the second authentication response message to the gateway control plane, and the second authentication response message includes the authentication result.

The second authentication response message further includes the feature attribute information of the user equipment.

Operation S110: The gateway control plane receives the second authentication response message.

Specifically, the gateway control plane receives the second authentication response message sent by the authentication server.

Operation S111: The gateway control plane sends a first authentication response message to the gateway user plane, where the first authentication response message includes the authentication result.

Specifically, regardless of whether the authentication succeeds or fails, the gateway control plane sends, to the gateway user plane, the first authentication response message that carries the authentication result.

The first authentication response message further includes the feature attribute information of the user equipment.

Operation S112: The gateway user plane receives the first authentication response message.

Specifically, when the gateway user plane and the gateway control plane are separately deployed, the gateway user plane receives, through the Sx session connection, the first authentication response message sent by the gateway control plane.

Operation S113: The gateway user plane sends a session connection create response message to the user equipment, where the session connection create response message includes the authentication result.

Specifically, the gateway user plane sends the session connection create response message to the user equipment by using the communication link, the session connection create response message includes the authentication result, and the authentication result is used to notify the user equipment whether the authentication succeeds. The authentication result or the session connection create response message is sent after being encrypted.

The session connection create response message further includes the feature attribute information of the user equipment.

Operation S114: The user equipment receives the session connection create response message.

Specifically, the user equipment receives, by using the communication link, the session connection create response message sent by the gateway user plane.

Operation S115: If the authentication result is that the authentication succeeds, the gateway control plane sends service policy information to the gateway user plane.

Specifically, when the gateway terminal module of the user equipment is authenticated, the gateway control plane sends the service policy information to the gateway user plane. The service policy information may be carried in the first authentication response message, or may not be carried in the first authentication response message, that is, the service policy information is sent after the first authentication response message is sent.

In a possible implementation, the service policy information includes at least one current network slice connection policy, the at least one current network slice connection policy is at least one original network slice connection policy or at least one updated network slice connection policy, and a network slice connection policy is used to indicate a session connection relationship between an application identifier and a network slice. The network slice connection policy includes a correspondence among an application identifier, an access type, and an access point name (APN), and reflects the session connection relationship between an application identifier and a network slice. In other words, a specific application is connected to a specific access point by using a specific access type.

In a possible implementation, the service policy information includes at least one service charging and control policy, and a service charging and control policy is used to indicate a correspondence between an application identifier and a charging and control policy. The service charging and control policy includes a correspondence between an application identifier and information such as a service identifier, a rating group, and quality of service (QoS), and reflects the correspondence between an application identifier and a charging and control policy. In other words, a specific application is charged and controlled by using a specific policy.

Two types of policies included in the service policy information do not constitute a limitation on Embodiment 1 of the present disclosure, and the service policy information may further include another type of policy.

It should be noted that operation S115 and operation S111 may be simultaneously performed. To be specific, when the gateway terminal module of the user equipment is authenticated, the gateway control plane simultaneously sends the first authentication response message and the service policy information to the gateway user plane, or the first authentication response message sent by the gateway control plane to the gateway user plane carries both the authentication result and the service policy information. Alternatively, operation S115 may be performed after operation S111. To be specific, the authentication response message is sent first, and the service policy information is sent when the gateway terminal module of the user equipment is authenticated.

Operation S116: The gateway user plane receives the service policy information.

Specifically, when the authentication result is that the authentication succeeds, the gateway user plane receives the service policy information sent by the gateway control plane, and caches the service policy information.

Likewise, when the authentication result is that the authentication succeeds, operation S116 and operation S112 may be simultaneously performed.

Operation S117: The gateway user plane sends the service policy information to the user equipment.

Specifically, the gateway user plane sends the service policy information to the user equipment by using the communication link. The service policy information is sent after being encrypted.

Likewise, when the authentication result is that the authentication succeeds, operation S117 and operation S113 may be simultaneously performed.

Operation S118: The user equipment receives the service policy information.

Specifically, when the authentication result is that the authentication succeeds, the user equipment receives the service policy information sent by the gateway user plane.

Likewise, when the authentication result is that the authentication succeeds, operation S118 and operation S114 may be simultaneously performed.

Operation S119: The user equipment performs service management based on the service policy information.

In a possible implementation, the user equipment obtains an application identifier of a current application; searches, for a network slice corresponding to the application identifier of the current application, the at least one current network slice connection policy that is sent by the gateway user plane by using the communication link; and establishes a session connection and performs service access based on the found network slice. For example, the user equipment obtains an application identifier of a current Internet of Things application, searches the at least one current network slice connection policy for a corresponding network slice, namely, a corresponding access type and access point name, initiates a session connection for the access point name based on the access type, and performs service access after establishing the session connection. In the possible implementation, the UE may independently select the network slice to perform the session connection and the service access, thereby reducing processing pressure of a core network device, and improving a processing capability of the UE.

In a possible implementation, the user equipment obtains an application identifier of a current application that accesses a data service; searches, for a charging and control policy corresponding to the application identifier of the current application, the at least one service charging and control policy that is sent by the gateway user plane by using the communication link; and collects statistics about data traffic and performs access control based on the found charging and control policy. The access control includes QoS control, remarking a differentiated services code point (DSCP) value of an uplink service packet, and the like. For example, the current application used by the user equipment to access a data service is a social application, an application identifier of the social application is obtained, and the at least one service charging and control policy is searched for a charging and control policy corresponding to the application identifier of the social application, and statistics about data traffic are collected and access control is performed based on the charging and control policy. In other words, statistics about traffic used by the social application are collected, and control is performed depending on usage. After the statistics are collected, the user equipment periodically sends a usage report request message to the gateway user plane by using the communication link, where the usage report request message includes the feature attribute information of the user equipment and statistics about traffic usage for an application, the usage report request message is used to request the gateway user plane to generate an online or offline call detail record and feed back a usage report confirmation message, and the usage report confirmation message is used to indicate that the gateway user plane has confirmed the statistics about traffic usage for an application. The statistics about traffic usage for an application include a statistics result of the traffic usage for the application, a service identifier, and a rating group.

When the service policy information includes another type of policy, the user equipment performs corresponding service management based on a specific policy.

In Embodiment 1 shown in FIG. 5A, FIG. 5B, and FIG. 5C, the user equipment obtains the communication address of the gateway user plane, establishes the communication link to the gateway user plane, and sends, to the gateway user plane by using the communication link, the session connection create request message that carries the authentication information of the gateway terminal module of the user equipment. When receiving the session connection create request message, the gateway user plane sends the authentication request message to the gateway control plane, and the authentication request message is used to trigger the gateway control plane to request the authentication server to perform authentication on the gateway terminal module of the user equipment. The authentication server performs authentication on the gateway terminal module of the user equipment, and feeds back the authentication result to the gateway control plane. When receiving the authentication result, the gateway control plane adds the authentication result to the authentication response message and sends the authentication response message to the gateway user plane, and the gateway user plane adds the authentication result to the session connection create response message and sends the session connection create response message to the user equipment. If the authentication result is that the authentication succeeds, the gateway control plane sends the service policy information to the gateway user plane, the gateway user plane sends the service policy information to the user equipment, and the user equipment performs service management based on the service policy information, so that the user equipment performs service management, a participation level of the user equipment can be increased, and a service management capability of the user equipment can be improved.

Figure 6A:
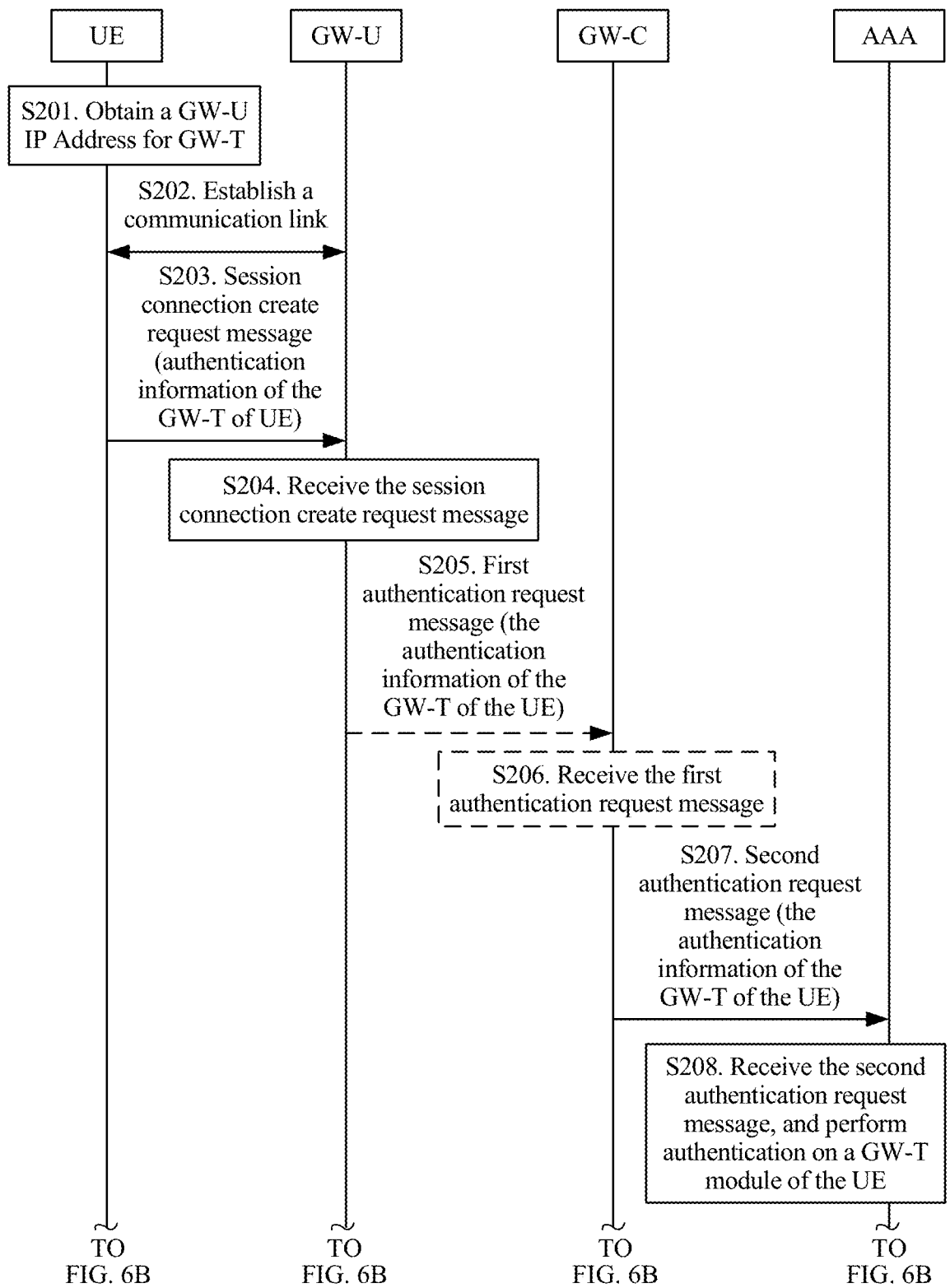
FIG. 6A, FIG. 6B, and FIG. 6C are a schematic communication diagram of a service management method according to Embodiment 2 of the present disclosure.
Figure 6B:
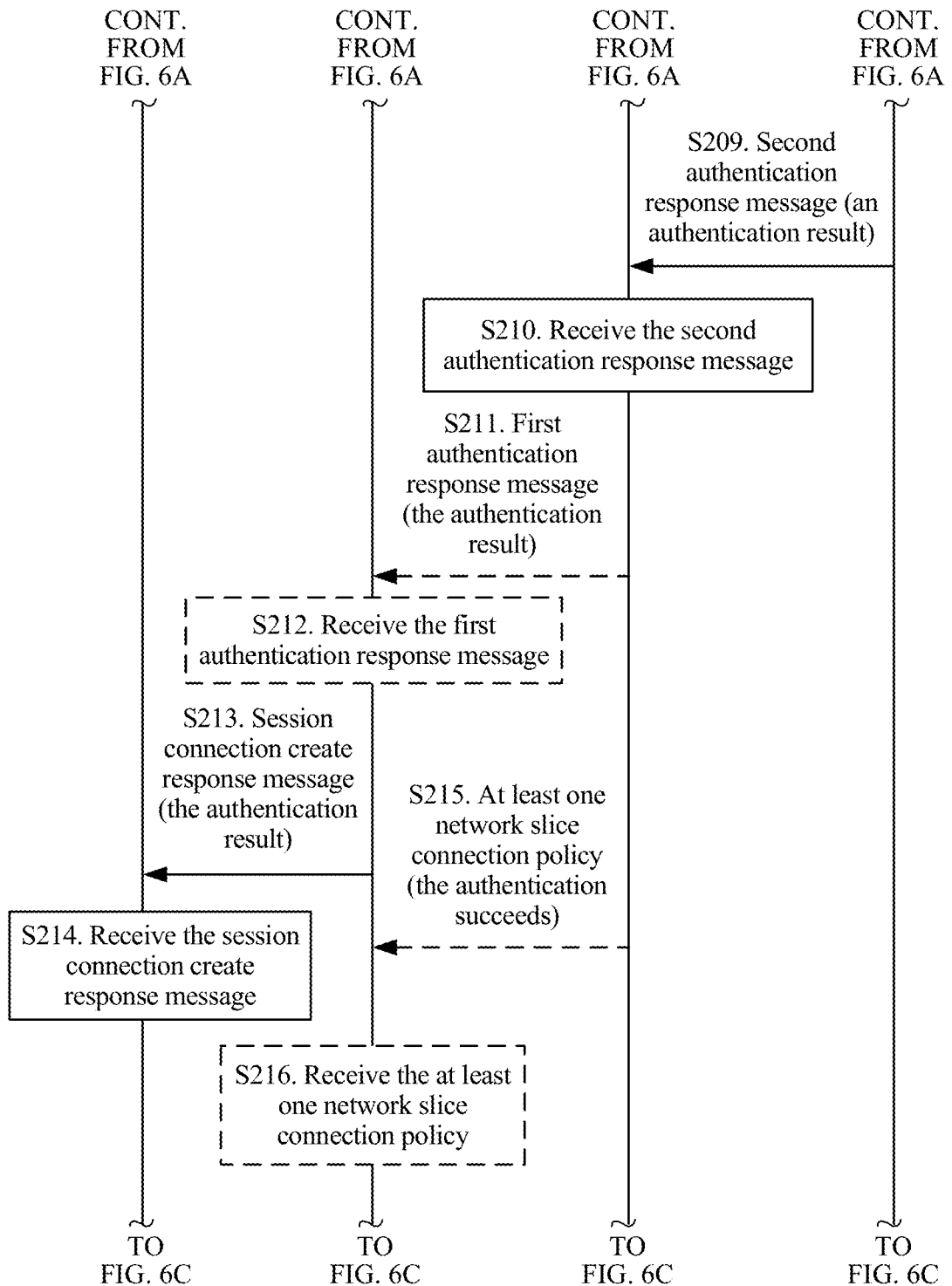
Figure 6C:
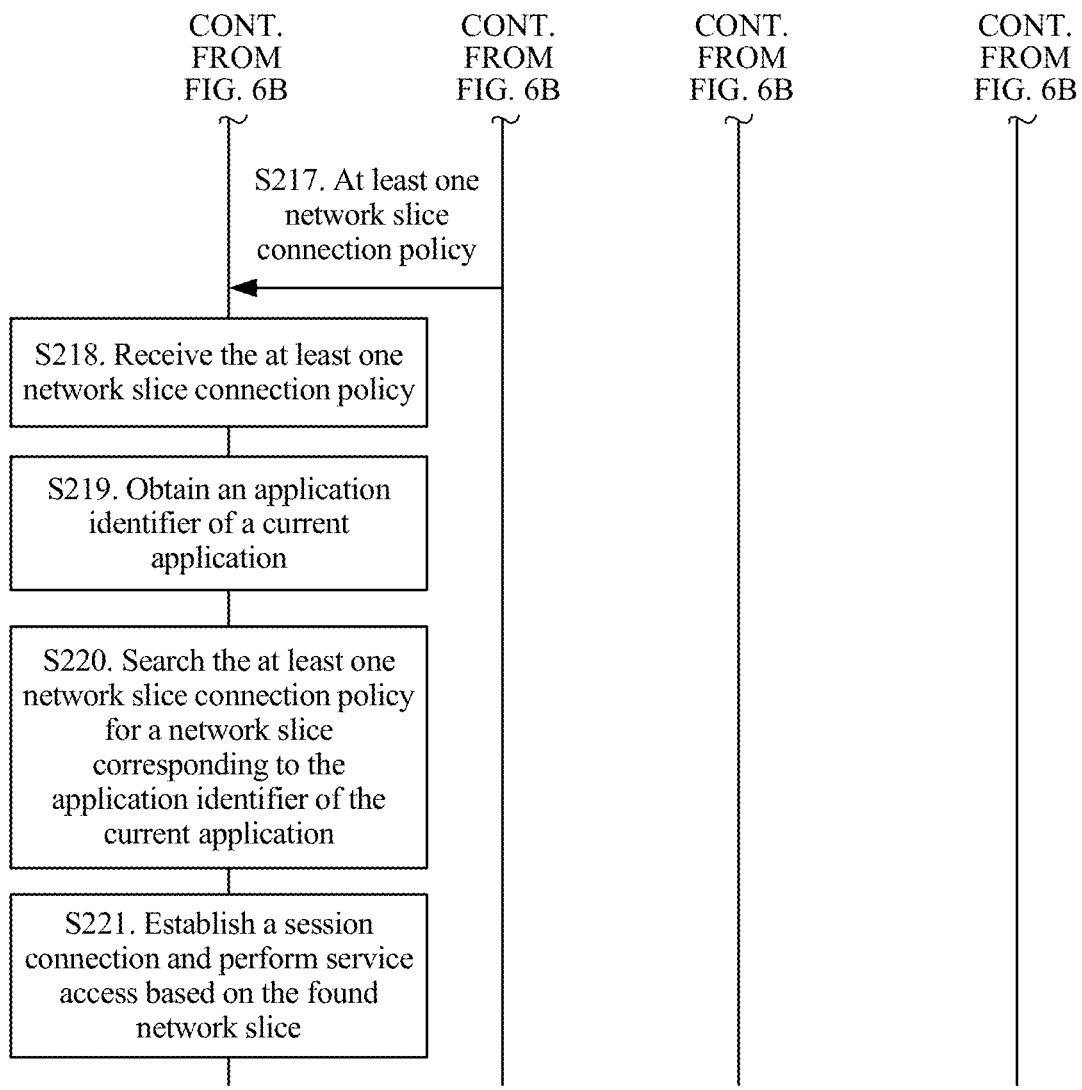

FIG. 6A, FIG. 6B, and FIG. 6C are a schematic communication diagram of a service management method according to Embodiment 2 of the present disclosure. An AAA shown in Embodiment 2 is an authentication server. The method includes, but is not limited to, the following operations.

Operation S201: UE obtains a GW-U IP Address for GW-T.

Operation S202: The UE establishes a communication link to a GW-U.

Operation S203: The UE sends a session connection create request message (authentication information of the GW-T of the UE) to the GW-U.

The session connection create request message further includes feature attribute information of the UE, and the feature attribute information of the UE includes information such as an MSISDN, an IMSI, and keyword information.

Operation S204: The GW-U receives the session connection create request message.

Operation S205: The GW-U sends a first authentication request message (the authentication information of the GW-T of the UE) to a GW-C.

The first authentication request message further includes the feature attribute information of the UE.

Operation S206: The GW-C receives the first authentication request message.

Operation S207: The GW-C sends a second authentication request message (the authentication information of the GW-T of the UE) to the AAA.

The second authentication request message further includes the feature attribute information of the UE.

Operation S208: The AAA receives the second authentication request message, and performs authentication on a GW-T module of the UE.

Operation S209: The AAA sends a second authentication response message (an authentication result) to the GW-C.

The second authentication response message further includes the feature attribute information of the UE.

Operation S210: The GW-C receives the second authentication response message.

Operation S211: The GW-C sends a first authentication response message (the authentication result) to the GW-U.

The first authentication response message further includes the feature attribute information of the UE.

Operation S212: The GW-U receives the first authentication response message.

Operation S213: The GW-U sends a session connection create response message (the authentication result) to the UE.

The session connection create response message further includes the feature attribute information of the UE.

Operation S214: The UE receives the session connection create response message.

For a specific process of operation S201 to operation S214, refer to the specific description of operation S101 to operation S114 in Embodiment 1 shown in FIG. 3. Details are not described herein again.

Operation S215: If the authentication result is that the authentication succeeds, the GW-C sends at least one network slice connection policy to the GW-U.

The at least one network slice connection policy is the at least one original network slice connection policy in Embodiment 1. A network slice connection policy is used to indicate a session connection relationship between an application identifier and a network slice. The network slice connection policy includes a correspondence among an application identifier, an access type, and an APN, and reflects the session connection relationship between an application identifier and a network slice. In other words, a specific application is connected to a specific access point by using a specific access type.

Operation S216: The GW-U receives the at least one network slice connection policy.

Operation S217: The GW-U sends the at least one network slice connection policy to the UE.

Operation S218: The UE receives the at least one network slice connection policy.

Specifically, the UE receives and caches the at least one network slice connection policy.

Operation S219: The UE obtains an application identifier of a current application.

The current application is an SLA application that is running on the UE, such as an AR application, an Internet of Things application, a remote medical treatment application, or a self-driving application, and the UE obtains the application identifier of the current application, that is, determines the application identifier of the application that is running. There may be one or more current applications. This is determined depending on a specific case.

Operation S220: The UE searches the at least one network slice connection policy for a network slice corresponding to the application identifier of the current application.

Specifically, the UE searches the at least one network slice connection policy for the network slice corresponding to the application identifier of the current application, that is, determines an access type and an APN that correspond to the current application identifier.

Operation S221: The UE establishes a session connection and performs service access based on the found network slice.

Specifically, the UE establishes the session connection to the APN based on the found access type and APN that correspond to the current application, and performs service access on the APN.

In Embodiment 2 shown in FIG. 6A, FIG. 6B, and FIG. 6C, the UE selects, based on the at least one network slice connection policy sent by the GW-U, the network slice corresponding to the application identifier of the current application, establishes the session connection, and performs service access, so that the UE dynamically and independently selects a network slice connection policy, thereby increasing a participation level of the UE and improving a processing capability of the UE.

Figure 7:
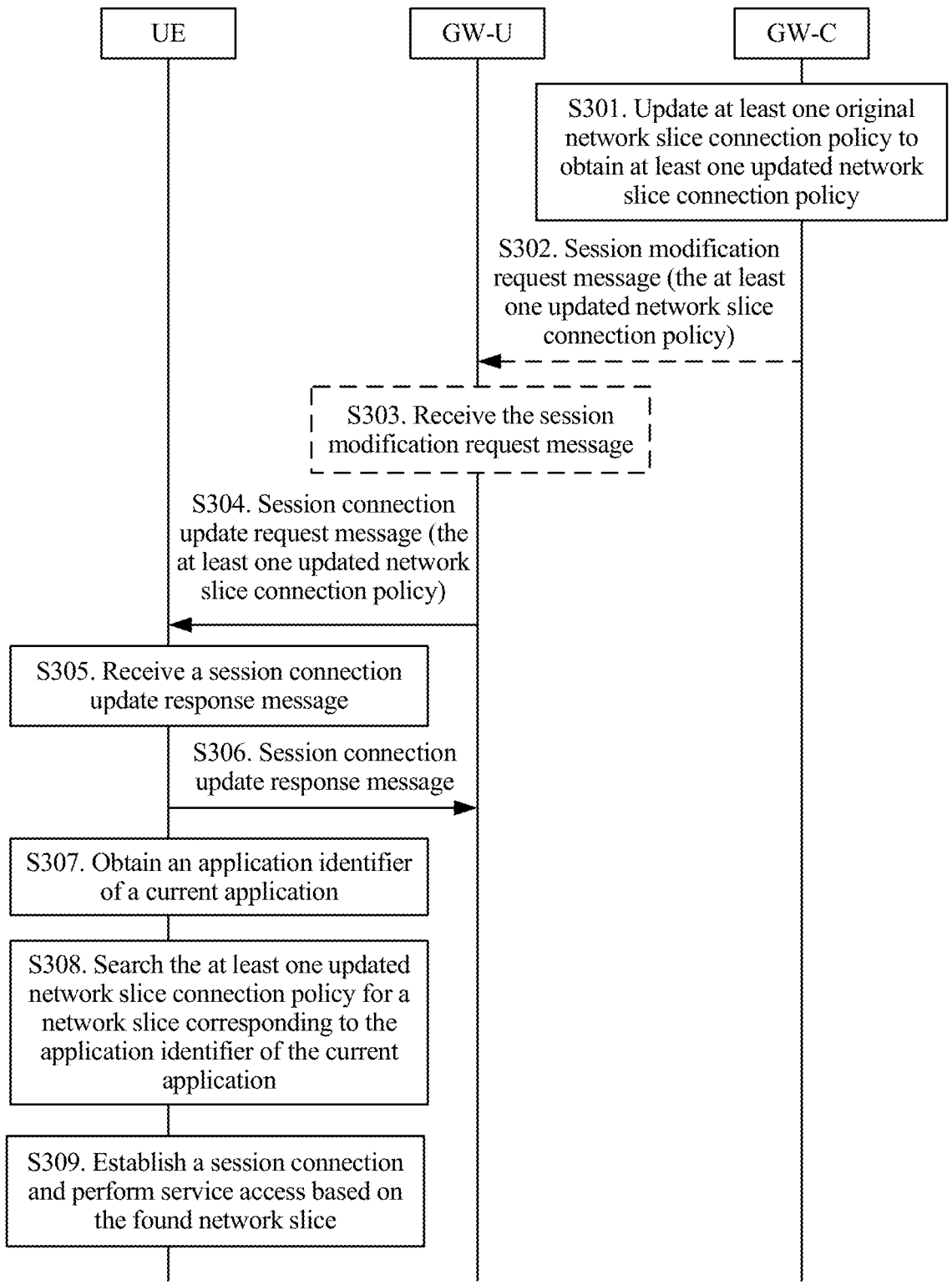
FIG. 7 is a schematic communication diagram of a service management method according to Embodiment 3 of the present disclosure.

FIG. 7 is a schematic communication diagram of a service management method according to Embodiment 3 of the present disclosure. In an application scenario of Embodiment 3, UE has been authenticated and obtains at least one original network slice connection policy, and a GW-C updates the at least one original network slice connection policy based on an adjustment of a network slice deployment architecture. The method includes, but is not limited to, the following operations.

Operation S301: The GW-C updates the at least one original network slice connection policy to obtain at least one updated network slice connection policy.

In an update process, the GW-C adjusts network slices corresponding to some application identifiers.

Operation S302: The GW-C sends a session modification request message (the at least one updated network slice connection policy) to a GW-U.

The session modification request message (Sx Session Modification Request) further includes feature attribute information of the UE.

Operation S303: The GW-U receives the session modification request message.

Operation S304: The GW-U sends a session connection update request message (the at least one updated network slice connection policy) to the UE.

The session connection update request message further includes the feature attribute information of the UE and an authentication result.

Operation S305: The UE receives the session connection update request message.

Specifically, the UE receives the session connection update request message, and caches the at least one updated network slice connection policy.

Operation S306: The UE sends a session connection update response message to the GW-U.

The session connection update response message is used to notify the GW-U that the UE has updated the at least one original network slice connection policy.

Operation S307: The UE obtains an application identifier of a current application.

Operation S308: The UE searches the at least one updated network slice connection policy for a network slice corresponding to the application identifier of the current application.

Operation S309: The UE establishes a session connection and performs service access based on the found network slice.

In Embodiment 3 shown in FIG. 7, after updating the at least one original network slice connection policy, the GW-C sends the at least one updated network slice connection policy to the GW-U, the GW-U delivers the at least one updated network slice connection policy to the UE, and the UE performs service management based on the at least one updated network slice connection policy.

Figure 8A:
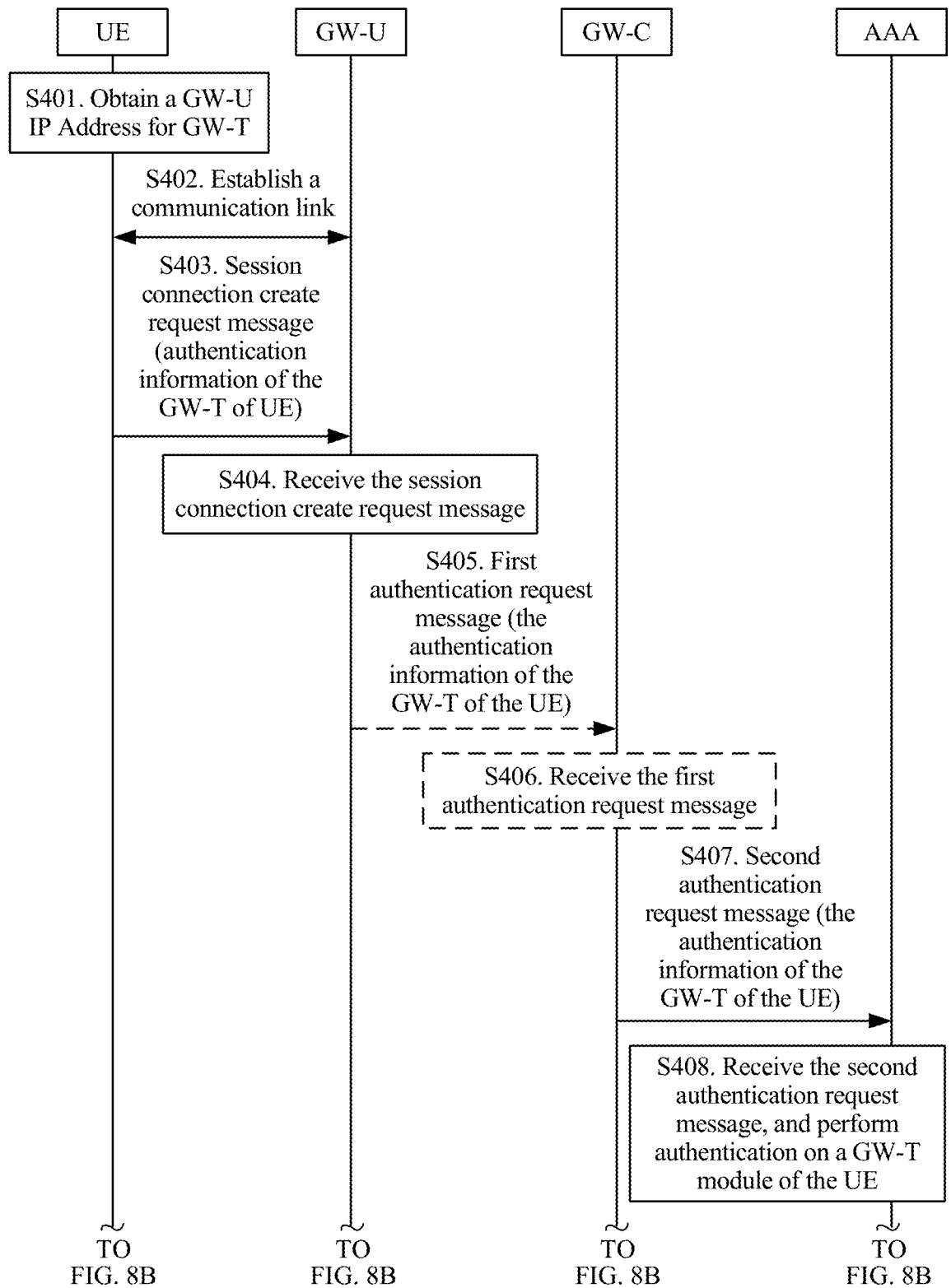
FIG. 8A, FIG. 8B, and FIG. 8C are a schematic communication diagram of a service management method according to Embodiment 4 of the present disclosure.
Figure 8B:
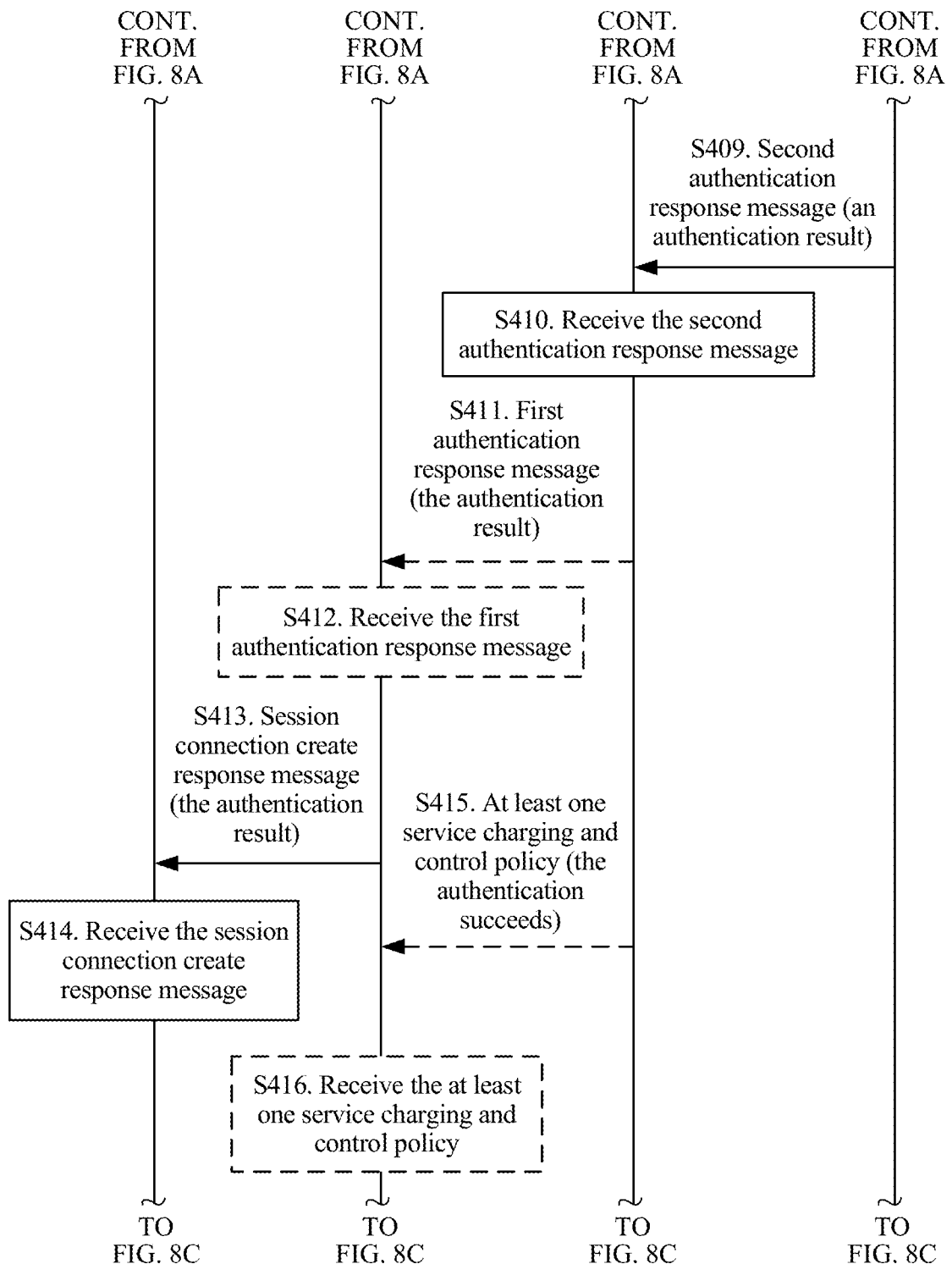
Figure 8C:
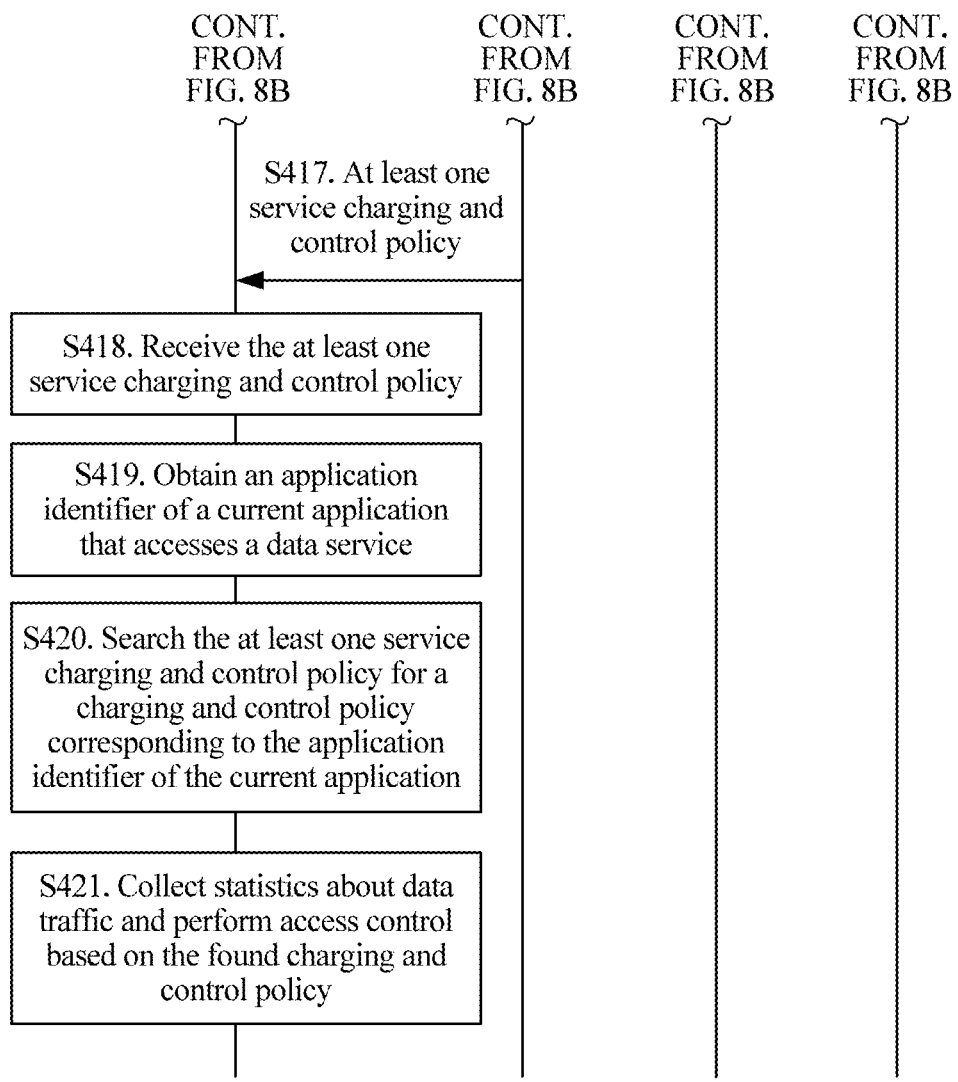

FIG. 8A, FIG. 8B, and FIG. 8C are a schematic communication diagram of a service management method according to Embodiment 4 of the present disclosure. The method includes, but is not limited to, the following operations.

Operation S401: UE obtains a GW-U IP Address for GW-T.

Operation S402: The UE establishes a communication link to a GW-U.

Operation S403: The UE sends a session connection create request message (authentication information of the GW-T of the UE) to the GW-U.

Operation S404: The GW-U receives the session connection create request message.

Operation S405: The GW-U sends a first authentication request message (the authentication information of the GW-T of the UE) to a GW-C.

Operation S406: The GW-C receives the first authentication request message.

Operation S407: The GW-C sends a second authentication request message (a session identifier of the authentication information of the GW-T of the UE) to an AAA.

Operation S408: The AAA receives the second authentication request message.

Operation S409: The AAA sends a second authentication response message (an authentication result) to the GW-C.

Operation S410: The GW-C receives the second authentication response message.

Operation S411: The GW-C sends a first authentication response message (the authentication result) to the GW-U.

Operation S412: The GW-U receives the first authentication response message.

Operation S413: The GW-U sends a session connection create response message (the authentication result) to the UE.

Operation S414: The UE receives the session connection create response message.

Operation S415: If the authentication result is that the authentication succeeds, the GW-C sends at least one service charging and control policy to the GW-U.

Specifically, a service charging and control policy includes a correspondence between an application identifier and information such as a service identifier, a rating group, and QoS, and reflects a correspondence between an application identifier and a charging and control policy. In other words, a specific application is charged and controlled by using a specific policy.

Operation S416: The GW-U receives the at least one service charging and control policy.

Operation S417: The GW-U sends the at least one service charging and control policy to the UE.

Operation S418: The UE receives the at least one service charging and control policy.

Operation S419: The UE obtains an application identifier of a current application that accesses a data service.

The current application that accesses a data service is an application that is running on the UE and that needs to connect to a network or use data traffic, and may include a social application, a shopping application, an audio application, a video application, and the like.

Operation S420: The UE searches the at least one service charging and control policy for a charging and control policy corresponding to the application identifier of the current application.

Operation S421: The UE collects statistics about data traffic and performs access control based on the found charging and control policy.

Specifically, after collecting the statistics about the data traffic, the UE periodically sends a usage report request message to the GW-U, where the usage report request message includes the feature attribute information of the UE and statistics about traffic usage for an application. The usage report request message is used to request the GW-U to generate an online or offline call detail record for the UE and feed back a usage report confirmation message, and the usage report confirmation message is used to indicate that the GW-U has confirmed the statistics about traffic usage for an application. The statistics about traffic usage for an application include a statistics result of the traffic usage for the application, a service identifier, and a rating group.

In Embodiment 3 shown in FIG. 8A, FIG. 8B, and FIG. 8C, the UE determines, based on the at least one service charging and control policy sent by the GW-U, the charging and control policy corresponding to the application identifier of the current application, and collects the statistics about the data traffic and performs access control, so that the UE collects the statistics about the data traffic and performs access control, thereby increasing a participation level of the UE and improving a processing capability of the UE.

It should be noted that the embodiments shown in FIG. 5A to FIG. 8C describe the case in which the gateway user plane and the gateway control plane are separately deployed. If the gateway user plane and the gateway control plane are deployed in an integrated manner, a process of interaction between the gateway user plane and the gateway control plane may be an internal operation of a device deployed in the integrated manner, and parts shown by dashed lines may not be presented in the schematic communication diagrams.

Figure 9:
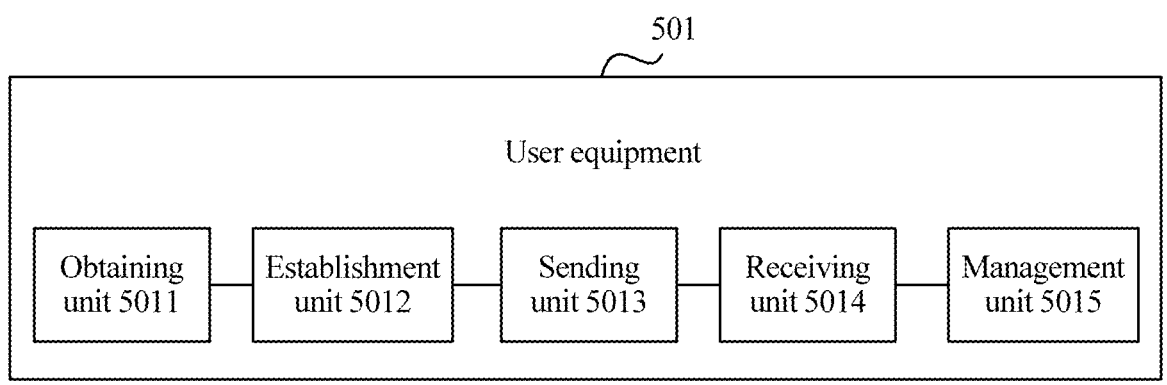
FIG. 9 is a schematic structural diagram of another user equipment according to an embodiment of the present disclosure.

FIG. 9 is a schematic structural diagram of another user equipment according to an embodiment of the present disclosure. User equipment 501 shown in FIG. 9 includes an obtaining unit 5011, an establishment unit 5012, a sending unit 5013, a receiving unit 5014, and a management unit 5015.

The obtaining unit 5011 is configured to obtain a communication address of a gateway user plane.

The establishment unit 5012 is configured to establish a communication link to the gateway user plane by using the communication address.

The sending unit 5013 is configured to send a session connection create request message to the gateway user plane by using the communication link, where the session connection create request message includes authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment.

The receiving unit 5014 is configured to receive, by using the communication link, a session connection create response message sent by the gateway user plane, where the session connection create response message includes an authentication result.

The management unit 5015 is configured to: if the authentication result is that the authentication succeeds, perform service management based on service policy information that is sent by the gateway user plane by using the communication link.

It should be noted that the obtaining unit 5011 is configured to perform operation S101 in Embodiment 1 shown in FIG. 5A, the establishment unit 5012 is configured to perform operation S102 in Embodiment 1 shown in FIG. 5A, the sending unit 5013 is configured to perform operation S103 in Embodiment 1 shown in FIG. 5A, the receiving unit 5014 is configured to perform operations S114 and S118 in Embodiment 1 shown in FIG. 5C, and the management unit 5015 is configured to perform operation S119 in Embodiment 1 shown in FIG. 5C. The obtaining unit 5011, the establishment unit 5012, and the management unit 5015 may be the processor 1011 of the user equipment shown in FIG. 3. The sending unit 5013 and the receiving unit 5014 may be the transceiver 1012 of the user equipment shown in FIG. 3.

Figure 10:
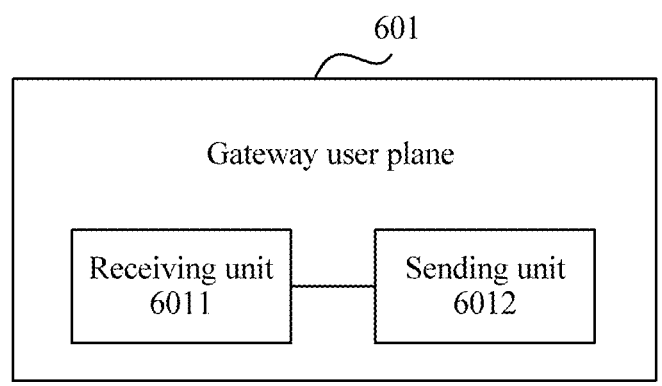
FIG. 10 is a schematic structural diagram of another gateway user plane according to an embodiment of the present disclosure.

FIG. 10 is a schematic structural diagram of another gateway user plane according to an embodiment of the present disclosure. A gateway user plane 601 shown in FIG. 10 includes a receiving unit 6011 and a sending unit 6012.

The receiving unit 6011 is configured to receive, by using a communication link, a session connection create request message sent by user equipment, where the session connection create request message includes authentication information of a gateway terminal module of the user equipment, and the communication link is a link established by the user equipment to the gateway user plane by using an obtained communication address of the gateway user plane.

The sending unit 6012 is configured to send an authentication request message to a gateway control plane, where the authentication request message includes the authentication information of the gateway terminal module of the user equipment, and the authentication request message is used to trigger the gateway control plane to request an authentication server to perform authentication on the gateway terminal module of the user equipment.

The receiving unit 6011 is further configured to receive an authentication response message sent by the gateway control plane.

The sending unit 6012 is further configured to send a session connection create response message to the user equipment by using the communication link, where the authentication response message and the session connection create response message include an authentication result.

The receiving unit 6011 is further configured to: if the authentication result is that the authentication succeeds, receive service policy information sent by the gateway control plane.

The sending unit 6012 is further configured to send the service policy information to the user equipment by using the communication link, where the service policy information is used by the user equipment to perform service management based on the service policy information.

It should be noted that the receiving unit 6011 is configured to perform operations S104, S112, and S116 in Embodiment 1 shown in FIG. 5A, FIG. 5B, and FIG. 5C, and the sending unit 6012 is configured to perform operations S105, S113, and S117 in Embodiment 1 shown in FIG. 5A and FIG. 5C. The receiving unit 6011 and the sending unit 6012 may be the transceiver 1022 of the gateway user plane shown in FIG. 4.

Methods or algorithm operations described in combination with the content disclosed in the embodiments of the present disclosure may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (Erasable Programmable ROM, EPROM), an electrically erasable programmable read only memory (Electrically EPROM, EEPROM), a register, a hard disk, a removable hard disk, a compact disc read only memory (CD-ROM), or any other form of storage medium well-known in the art. For example, a storage medium is coupled to a processor, so that the processor can read information from the storage medium or write information into the storage medium. Certainly, the storage medium may be alternatively a component of the processor. The processor and the storage medium may be located in an ASIC. In addition, the ASIC may be located in a first management unit or a second management unit. Certainly, the processor and the storage medium may alternatively exist in a first management unit or a second management unit as discrete components.

A person skilled in the art should be aware that in the foregoing one or more examples, functions described in the embodiments of the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the embodiments of the present disclosure are further described in detail. It should be understood that the foregoing descriptions are merely specific implementations of the embodiments of the present disclosure, but are not intended to limit the protection scope of the embodiments of the present disclosure. Any modification, equivalent replacement, or improvement made based on the technical solutions of the embodiments of the present disclosure shall fall within the protection scope of the embodiments of the present disclosure.

What is claimed is:

1. A service management method, comprising:
   obtaining, by a user equipment, a communication address of a gateway user plane, and establishing a communication link to the gateway user plane by using the communication address;
   sending, by the user equipment, a session connection create request message to the gateway user plane by using the communication link, wherein the session connection create request message comprises authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment;
   receiving, by the user equipment by using the communication link, a session connection create response message sent by the gateway user plane, wherein the session connection create response message comprises an authentication result;
   sending, by the user equipment, a session connection update response message to the gateway user plane by using the communication link, wherein the session connection update response message is used to indicate that the user equipment has updated at least one original network slice connection policy; and
   if the authentication result is that the authentication succeeds, performing, by the user equipment, service management based on service policy information that is sent by the gateway user plane by using the communication link, including obtaining, by the user equipment, an application identifier of a current application; searching, by the user equipment for a network slice corresponding to the application identifier of the current application, at least one current network slice connection policy that is sent by the gateway user plane by using the communication link; and
   establishing, by the user equipment, a session connection and performing service access based on the found network slice,
   wherein the service policy information comprises the at least one current network slice connection policy, wherein the at least one current network slice connection policy includes the at least one original network slice connection policy or at least one updated network slice connection policy, and a network slice connection policy is used to indicate a session connection relationship between an application identifier and a network slice.

2. The method according to claim 1, wherein the service policy information comprises at least one service charging and control policy, and a service charging and control policy is used to indicate a correspondence between an application identifier and a charging and control policy; and the performing, by the user equipment, service management based on service policy information that is sent by the gateway user plane by using the communication link comprises:

obtaining, by the user equipment, an application identifier of a current application that accesses a data service;

searching, by the user equipment for a charging and control policy corresponding to the application identifier of the current application, the at least one service charging and control policy that is sent by the gateway user plane by using the communication link; and collecting, by the user equipment, statistics about data traffic and performing access control based on the found charging and control policy.

3. The method according to claim 2, wherein after the performing, by the user equipment, service management based on service policy information that is sent by the gateway user plane by using the communication link, the method further comprises:

periodically sending, by the user equipment, a usage report request message to the gateway user plane by using the communication link, wherein the usage report request message comprises feature attribute information of the user equipment and statistics about traffic usage for an application, the usage report request message is used to request the gateway user plane to generate an online or offline call detail record and feed back a usage report confirmation message, and the usage report confirmation message is used to indicate that the gateway user plane has confirmed the statistics about traffic usage for an application.

4. The method according to claim 1, wherein the obtaining, by user equipment, a communication address of a gateway user plane comprises:

obtaining, by the user equipment, the communication address of the gateway user plane based on an attach response message sent by an access network gateway, wherein the attach response message comprises the communication address of the gateway user plane; or obtaining, by the user equipment, the communication address of the gateway user plane based on preconfiguration information of the user equipment; or obtaining, by the user equipment, the communication address of the gateway user plane in a configuration manner selected by a user.

5. The method according to claim 1, wherein before the establishing, by user equipment, a communication link to the gateway user plane by using the communication address, the method further comprises:

detecting, by the user equipment, whether the gateway terminal module of the user equipment, a right of the user equipment, and a network operating environment meet a preset condition; and if a detection result is yes, performing, by the user equipment, the operation of establishing a communication link to the gateway user plane by using the communication address.

6. A user equipment, comprising a processor and a transceiver, wherein the processor is configured to: obtain a communication address of a gateway user plane, and establish a communication link to the gateway user plane by using the communication address;

the transceiver is configured to send a session connection create request message to the gateway user plane by using the communication link, wherein the session connection create request message comprises authentication information of a gateway terminal module of the user equipment, and the authentication information of the gateway terminal module of the user equipment is used by the gateway user plane to trigger a gateway control plane to request an authentication server to perform authentication on the gateway terminal module of the user equipment;

the transceiver is further configured to receive, by using the communication link, a session connection create response message sent by the gateway user plane, wherein the session connection create response message comprises an authentication result;

the transceiver is further configured to send a session connection update response message to the gateway user plane by using the communication link, wherein the session connection update response message is used to indicate that the user equipment has updated at least one original network slice connection policy; and if the authentication result is that the authentication succeeds, the processor is further configured to perform service management based on service policy information that is sent by the gateway user plane by using the communication link, including obtaining an application identifier of a current application;

searching, for a network slice corresponding to the application identifier of the current application, at least one current network slice connection policy that is sent by the gateway user plane by using the communication link; and establishing a session connection and performing service access based on the found network slice, wherein the service policy information comprises the at least one current network slice connection policy, wherein the at least one current network slice connection policy includes the at least one original network slice connection policy or at least one updated network slice connection policy, and a network slice connection policy is used to indicate a session connection relationship between an application identifier and a network slice.

7. The user equipment according to claim 6, wherein the service policy information comprises at least one service charging and control policy, and a service charging and control policy is used to indicate a correspondence between an application identifier and a charging and control policy; and the processor is specifically configured to: obtain an application identifier of a current application that accesses a data service; search, for a charging and control policy corresponding to the application identifier of the current application, the at least one service charging and control policy that is sent by the gateway user plane by using the communication link; and collect statistics about data traffic and perform access control based on the found charging and control policy.

8. The user equipment according to claim 7, wherein the transceiver is further configured to periodically send a usage report request message to the gateway user plane by using the communication link, wherein the usage report request message comprises feature attribute information of the user equipment and statistics about traffic usage for an application, the usage report request message is used to request the gateway user plane to generate an online or offline call detail record and feed back a usage report confirmation message, and the usage report confirmation message is used to indicate that the gateway user plane has confirmed the statistics about traffic usage for an application.

9. The user equipment according to claim 6, wherein the processor is specifically configured to: obtain the communication address of the gateway user plane based on an attach response message sent by an access network gateway, wherein the attach response message comprises the communication address of the gateway user plane; or obtain the communication address of the gateway user plane based on preconfiguration information of the user equipment; or obtain the communication address of the gateway user plane in a configuration manner selected by a user.

10. The user equipment according to claim 6, wherein
the processor is further configured to detect whether the gateway terminal module of the user equipment, a right of the user equipment, and a network operating environment meet a preset condition; and
if a detection result is yes, the transceiver performs the operation of establishing a communication link to the gateway user plane by using the communication address.

11. A gateway user plane, comprising a processor and a transceiver, wherein
the transceiver is configured to receive, by using a communication link, a session connection create request message sent by a user equipment, wherein the session connection create request message comprises authentication information of a gateway terminal module of the user equipment, and the communication link is a link established by the user equipment to the gateway user plane by using an obtained communication address of the gateway user plane;
the transceiver is further configured to send an authentication request message to a gateway control plane, wherein the authentication request message comprises the authentication information of the gateway terminal module of the user equipment, and the authentication request message is used to trigger the gateway control plane to request an authentication server to perform authentication on the gateway terminal module of the user equipment;
the transceiver is further configured to: receive an authentication response message sent by the gateway control plane, and send a session connection create response message to the user equipment by using the communication link, wherein the authentication response message and the session connection create response message comprise an authentication result; and
if the authentication result is that the authentication succeeds, the transceiver is further configured to: receive service policy information sent by the gateway control plane, and send the service policy information to the user equipment by using the communication link, wherein the service policy information is used by the user equipment to perform service management based on the service policy information,
wherein the service policy information comprises at least one current network slice connection policy, the at least one current network slice connection policy is at least one original network slice connection policy or at least one updated network slice connection policy, and a network slice connection policy is used to indicate a session connection relationship between an application identifier and a network slice; and
the transceiver is further configured to receive, by using the communication link, a session connection update response message sent by the user equipment, wherein the session connection update response message is used to indicate that the user equipment has updated the at least one original network slice connection policy.

12. The gateway user plane according to claim 11, wherein the service policy information comprises at least one service charging and control policy, and a service charging and control policy is used to indicate a correspondence between an application identifier and a charging and control policy.

13. The gateway user plane according to claim 12, wherein
the transceiver is further configured to receive, by using the communication link, a usage report request message periodically sent by the user equipment, wherein the usage report request message comprises feature attribute information of the user equipment and statistics about traffic usage for an application; and
the processor is configured to: generate an online or offline call detail record based on the usage report request message and feed back a usage report confirmation message to the user equipment by using the communication link, wherein the usage report confirmation message is used to indicate that the gateway user plane has confirmed the statistics about traffic usage for an application.

14. The gateway user plane according to claim 11, wherein the session connection create request message further comprises feature attribute information of the user equipment, and the feature attribute information of the user equipment comprises a mobile station integrated services digital network number (MSISDN) and an international mobile subscriber identity (IMSI).

* * * * *